(12) United States Patent
Roy et al.

(10) Patent No.: US 11,681,967 B2
(45) Date of Patent: *Jun. 20, 2023

(54) SYSTEM AND METHOD FOR ELECTRICAL GRID MANAGEMENT, RISK MITIGATION, AND RESILIENCE

(71) Applicant: ElectricFish Energy Inc.

(72) Inventors: Sneha Roy, Fremont, CA (US); Folasade Ayoola, Stanford, CA (US); Anurag Kamal, Sunnyvale, CA (US); Nelio Batista do Nascimento, Mountain View, CA (US); Vincent Curtis Wong, Berkeley, CA (US)

(73) Assignee: ELECTRICFISH ENERGY INC., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,590

(22) Filed: Mar. 7, 2022

(65) Prior Publication Data
US 2022/0261715 A1  Aug. 18, 2022

Related U.S. Application Data

(63) Continuation of application No. 17/385,624, filed on Jul. 26, 2021, now Pat. No. 11,270,243, which is a
(Continued)

(51) Int. Cl.
*H01M 10/44* (2006.01)
*H01M 10/46* (2006.01)
(Continued)

(52) U.S. Cl.
CPC .......... *G06Q 10/0635* (2013.01); *B60L 53/60* (2019.02); *G06N 20/00* (2019.01); *G06Q 50/06* (2013.01); *H02J 3/322* (2020.01)

(58) Field of Classification Search
CPC ...... H02J 3/322; H02J 3/32; H02J 7/07; H02J 2203/10; B60L 53/60; B60L 53/53; B60L 53/66; G06Q 10/0635; G06Q 50/06
(Continued)

(56) References Cited

U.S. PATENT DOCUMENTS 8,378,627 B2  2/2013 Asada et al.
9,026,347 B2  5/2015 Gadh et al.
(Continued)

FOREIGN PATENT DOCUMENTS

| JP | 6194795 B2 | 9/2017 |
| WO | 20180227270 A1 | 12/2018 |
| WO | 2021002972 A1 | 1/2021 |

OTHER PUBLICATIONS

Alshawish Ali et al., Risk mitigation in electric power systems: Where to start?, Energy Informatics, vol. No. 34, 2019 DOI:10.1186/s42162-019-0099-6.
(Continued)

*Primary Examiner* — Edward Tso
(74) *Attorney, Agent, or Firm* — Galvin Patent Law LLC; Brian R. Galvin

(57) ABSTRACT

A system and method for providing risk mitigation and resilience to the electrical grid system by allowing bi-directional electricity usage from a distributed network of energy storage stations to form a large, distributed resource for the grid. A machine learning optimization module ingests various forms of data—from grid telemetry to traffic data to trip-to-trip data and more—in order to make informed spatiotemporal decisions about strategically placing and balancing energy stores across various regions to support optimum energy usage, risk mitigation, and grid fortification. Energy stores are then sent updated parameters as to the amount of energy to hold or release.

19 Claims, 15 Drawing Sheets

Related U.S. Application Data continuation-in-part of application No. 17/317,563, filed on May 11, 2021, now abandoned, which is a continuation-in-part of application No. 17/085,352, filed on Oct. 30, 2020, now Pat. No. 11,007,891.

(60) Provisional application No. 63/086,098, filed on Oct. 1, 2020.

(51) Int. Cl.
  *G06Q 10/0635* (2023.01)
  *G06Q 50/06* (2012.01)
  *G06N 20/00* (2019.01)
  *B60L 53/60* (2019.01)
  *H02J 3/32* (2006.01)

(58) Field of Classification Search
  USPC .................. 320/107, 110, 114, 132, 149
  See application file for complete search history.

(56) References Cited

U.S. PATENT DOCUMENTS

| | | |
|---|---|---|
| 10,686,314 B2 | 6/2020 | Matan et al. |
| 11,036,250 B2 | 6/2021 | Yang et al. |
| 11,270,243 B1 * | 3/2022 | Roy .................. H02J 3/322 |
| 2016/0117759 A1 | 4/2016 | Penilla et al. |
| 2017/0106764 A1 | 4/2017 | Beaston et al. |
| 2018/0278168 A1 | 9/2018 | Brown et al. |
| 2018/0358812 A1 | 12/2018 | Anderson et al. |

OTHER PUBLICATIONS

Semenova, A., Patent Cooperation Treaty International Search Report issued in corresponding application No. PCT/US2022/028861 dated Aug. 9, 2022.

Semenova, A., Written Opinion of the International Searching Authority issued in corresponding application No. PCT/US2022/028861 dated Aug. 9, 2022.

* cited by examiner

SYSTEM AND METHOD FOR ELECTRICAL GRID MANAGEMENT, RISK MITIGATION, AND RESILIENCE

CROSS-REFERENCE TO RELATED APPLICATIONS

Priority is claimed in the application data sheet to the following patents or patent applications, the entire written description, including figures, of each of which is expressly incorporated herein by reference in its entirety:
Ser. No. 17/385,624
Ser. No. 17/317,563
Ser. No. 17/085,352
63/086,098

BACKGROUND OF THE INVENTION

Field of the Invention

This disclosure relates to the field of energy conservation and management, and more particularly to the field of power grid resource management and risk mitigation.

Discussion of the State of the Art

Electricity is by its nature difficult to store so must be generated as it is needed for large-scale applications. Consequently, unlike other energy sources, it is not possible to keep a supply on hand and simply transfer it to a customer. Furthermore, supply and demand vary continuously under ever-changing conditions. Utility companies must closely monitor grid demand to determine how to allocate energy resources, which can mean that electricity is unavailable for charging in many cases, such as blackouts and brownouts. Current EV (Electric Vehicle) charging systems only allow power to flow in one direction: from the grid through the charging system and into the EVs internal battery, i.e., they are nothing more than an outlet for an EV car. While some applications of vehicle-to-grid power transfer exist, they are critically limited by human behavior—time of power transfer—on a large scale as to make a sufficient negative impact in meeting increased demand in hours of short supply. With increased adoption of electric vehicles in the effort to decarbonize transportation, particularly with the deep integration of variable renewable energy resources in the generation resource mix, it becomes increasing challenging to balance the grid and ensure reliability of supply. The occurrence of failure events has significant social and economic cost which disproportionately impacts lower-income, non-White communities. Additionally, these communities are less prepared for such events, and less likely to recover as quickly.

What is needed is a system and method for electrical grid risk mitigation, fortification, and resilience by allowing bi-directional electricity usage from a distributed network of energy storage stations to form a large, distributed resource for the grid as well as ensuring equitable access to energy.

SUMMARY OF THE INVENTION

Accordingly, the inventor has developed and reduced to practice a system and method for providing risk mitigation and resilience to the electrical grid system by allowing bi-directional electricity usage from a distributed network of energy storage stations to form a large, distributed resource for the grid. A machine learning optimization module ingests various forms of data—from grid telemetry to traffic data and more—in order to make informed spatiotemporal decisions about strategically balancing energy stores across various regions to support optimum energy usage and risk mitigation. Spatiotemporal decisions may include determining optimal site selection of the physical units themselves, among other aspects. Energy stores are sent updated parameters as to the amount of energy to hold or release.

According to a first preferred embodiment, a system for electrical grid management, risk-mitigation, and resilience is disclosed, comprising: a first computing device comprising a memory, a processor, and a non-volatile data storage device; a second computing device comprising a memory, a processor, and a non-volatile data storage device; a high-voltage battery pack; an input isolator comprising power electronic components forming a circuit topography that cause the input isolator to: receive a control signal from a controller, connect to an AC grid; receive AC power from the AC grid; convert the AC power to DC power using an AC-DC power converter; store the DC power in the high-voltage battery pack; convert the DC power in the high-voltage battery pack to AC power using an DC-AC power converter, provide the converted AC power to the AC grid; and provide electrical isolation between the AC grid and DC connected internal components; a controller comprising a first plurality of programming instructions stored in the memory of, and operating on the processor of, the first computing device, wherein the first plurality of programming instructions, when operating on the processor, cause the first computing device to: send a control signal to the input isolator, monitor high-voltage battery pack health and status data; monitor power electronic health and status data; and transmit and receive electronic health and status data, to an optimization core; and an optimization core comprising a first plurality of programming instructions stored in the memory of, and operating on the processor of, the second computing device, wherein the first plurality of programming instructions, when operating on the processor, cause the second computing device to: retrieve training data relating to the electrical grid and its components for a plurality of specified regions; retrieve training data relating to the climate and weather for a plurality of specified regions; retrieve training data relating to socio-economic factors for a plurality of specified regions; retrieve training data relating to local behavior patterns for a plurality of specified regions; use the training data for each of the specified regions in the plurality of specified regions to calculate an overall risk score for each specified region; retrieve a status on the current energy demands for each of the specified regions in the plurality of specified regions; receive electronic health and status data from the controller; use the overall risk scores and the current energy demands for each of the specified regions and the electronic health and status data from the controller to optimize the energy storage of the high-voltage battery pack; and send a control signal to the controller, the control signal causes the high-voltage battery pack to store more DC power, store less DC power, or maintain the current level of DC power.

According to a second preferred embodiment, a method for electrical grid management, risk-mitigation, and resilience is disclosed, comprising the steps of: retrieving training data relating to the electrical grid and its components for a plurality of specified regions; retrieving training data relating to the climate and weather for a plurality of specified regions; retrieving training data relating to socio-economic factors for a plurality of specified regions; retrieving training data relating to local behavior patterns for a plurality of specified regions; using the training data for each of the specified regions in the plurality of specified regions to calculate an overall risk score for each specified region; retrieving a status on the current energy demands for each of the specified regions in the plurality of specified regions; receiving electronic health and status data about a high-voltage battery pack; using the overall risk scores and the current energy demands for each of the specified regions and the electronic health and status data about a high-voltage battery pack to optimize the energy storage of the high-voltage battery pack; and sending a control signal, the control signal causing the high-voltage battery pack to store more DC power, store less DC power, or maintain the current level of DC power.

According to various aspects; wherein the high-voltage battery pack further comprises an ultracapacitor which increases the overall lifetime of the system and improves the frequency response of grid balancing operations; wherein the controller sets the time of charging of the high-voltage battery based on a grid condition; wherein the grid condition is a time period wherein electricity rates are low; wherein the grid condition is a time period when the proportion of energy supply to the grid from renewable energy sources is high; further comprising two or more high-voltage battery packs; wherein risk scores are calculated using neural networks; wherein the neural networks use a k-nearest neighbors model; wherein the optimization core retrieves non-training data; wherein the non-training data is preprocessed for use in neural networks; wherein the high-voltage battery pack further comprises an ultracapacitor which increases the overall lifetime of the system and improves the frequency response of grid balancing operations; further comprising electronic health and status data about two or more high-voltage battery packs; further comprising one or more control signals, the control signals causing the two or more high-voltage battery packs to each store more DC power, store less DC power, or maintain its current level of DC power; wherein non-training data is first preprocessed into training data; wherein the physical placement of current and future high-voltage battery packs is determined using the overall risk scores from a plurality of regions; wherein the configuration of the high-voltage battery packs is determined using a machine learning model.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
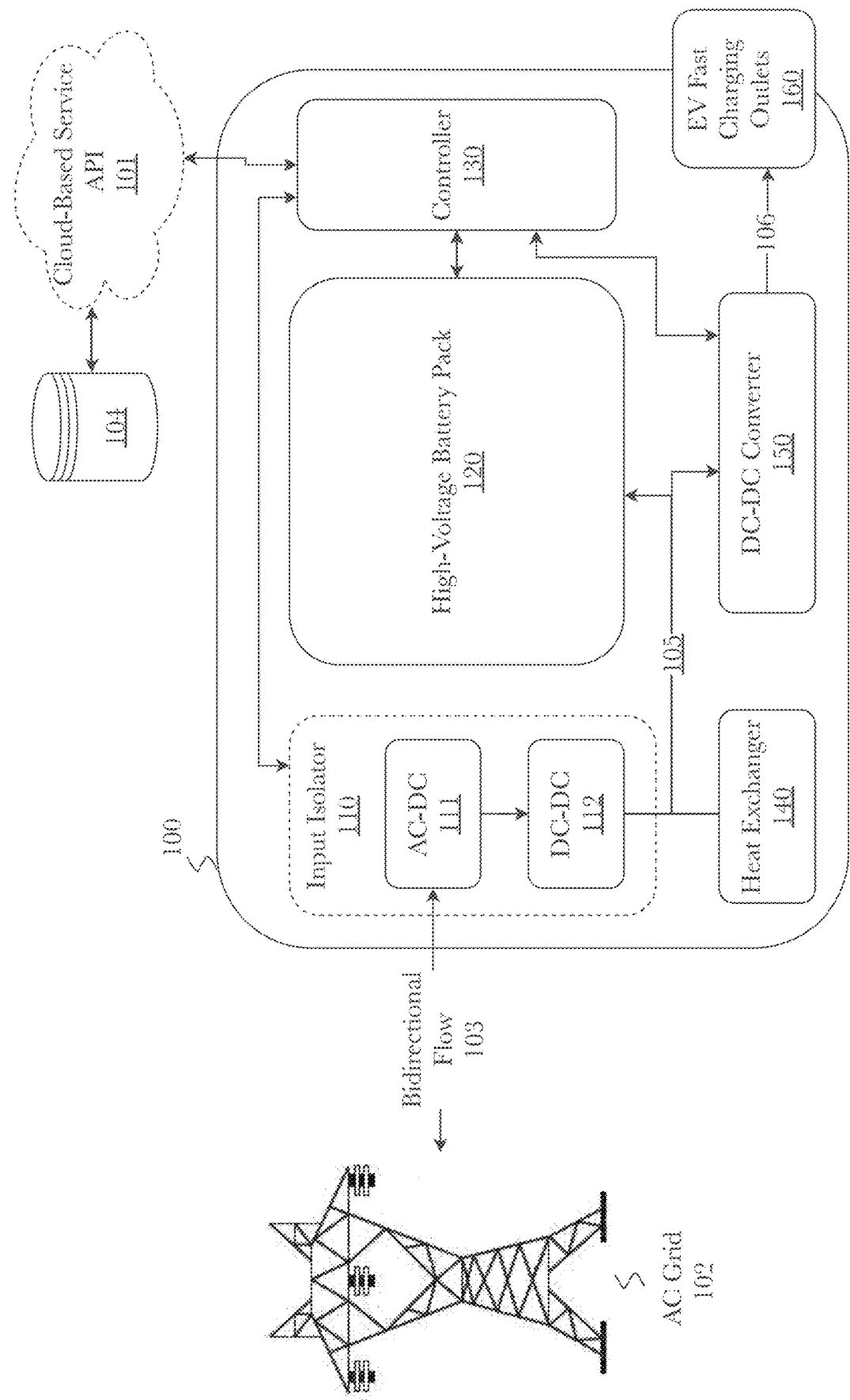
FIG. 1 is a diagram of an exemplary system architecture for an extremely fast charging and distributed grid resource adequacy management system.

Accordingly, the inventor has developed and reduced to practice a system and method for providing risk mitigation and resilience to the electrical grid system by allowing bi-directional electricity usage from a distributed network of energy storage stations to form a large, distributed resource for the grid. A machine learning optimization module ingests various forms of data—from grid telemetry to traffic data and more—in order to make informed spatiotemporal decisions about strategically balancing energy stores across various regions to support optimum energy usage and risk mitigation. Energy stores are sent updated parameters as to the amount of energy to hold or release.

According to one embodiment, energy storage stations are set up strategically in one or more regions. The basis for such a strategy may be physical traits (e.g., fire hazard risk level, below sea-level, antiquated infrastructure, etc.), socio-economic traits (e.g., median-household income, disadvantaged communities, propensity of EV ownership, etc.), or electrical grid characteristics (e.g., demand, location in the feeder network, etc.). One anticipated aspect is that EV charging stations will begin to match the numbers of fuel stations and potentially overcome fuel stations as EV vehicles overtake fuel vehicles. In such a case, fuel stations may be converted into EV stations which may serve very well considering the actual energy storage battery packs disclosed herein may be stored where there was once fuel storage—underground. Many different reasons and strategies may work for system and the disclosed invention is not limited to any strategy.

With energy stores in place, cloud-based neural networks begin learning about the grid, and patterns thereof. The neural networks learn this by ingested data such as telemetry already available from devices on the grid, the energy storage stations, and basically any type of data that is reasonable for learning the patterns and behaviors of the grid—which inherently means the users as well. Grid data helps identify regions with frequent network outages and compare such to unfulfilled grid capacity in corresponding energy storage stations. Climate data informs the neural networks about such things as potential natural disasters or frequent fire events which often disrupt electric lines in an affected region—frequent power outages are often a surrogate for greater grid need. Traffic and socio-economic data can, from a business sense, increase profitability by determining areas with a higher propensity of EV drivers. Partnerships with state/region wide utility companies further improve the neural networks. CEC (California Energy Commission) and CCAs (Community Choice Aggregation) may incorporate identified regions into their grant themes/focuses to bring capital to underinvested communities.

The neural networks provide a rank/score as to the electrical demand and electrical vulnerability of regions. Combining the knowledge of regional electrical demand/vulnerability with regional climate and socio-economic information along with strategically placed energy stores allows for a greater command of our electrical grid and its future. The optimization of stored/released energy to the grid is performed via the neural networks but controlled from an optimization core which sends updated parameters to energy stores to change or maintain the amount of energy stored.

Furthermore, national security experts have identified our electrical grid system and a potential target for terrorist attacks. This machine learning/energy storage approach mitigates such an attack by providing as-fast-as-can-be reactions to changes in the grid and having energy stores in place when current power generation fails.

Another aspect comprises building on existing estimates of cost and impact on the energy distribution network, based on cost-benefit analysis framework, by adding target impact factors as inputs into an optimization core. These impact factors would be prioritized based on availability of a validation dataset (i.e., existing studies, etc.). The final output would be a web app based data aggregator, that enables open API access for using the one or more machine learning algorithms disclosed herein. The API and web app may make available GIS and map overlays for managing the optimization core.

According to one embodiment, the charging station is a single-box, self-contained charging system that integrates charging technologies that are only available separately and not necessarily compatible with one another. The single-box, self-contained nature of the system allows charging stations to be easily transported and deployed to various location types, while only requiring a three-phase connection to an electrical grid. According to an embodiment, the system may consist of a controller unit that is responsible for: sending control signals to power electronic components, cooling systems, battery pack, and fire prevention system; exchanging data via an application programming interface connected to a cloud-based service that persists and manages a charging network database, where the deployment of one or more of these systems and their connections to the cloud-based service form a distributed charging network; and optimizing the performance of the system. According to an embodiment, the system further comprises a high-voltage battery pack capable of rapid charge-discharge rates to facilitate extreme fast charging (XFC) for electric vehicles and to support grid resource management by providing supplemental power distribution to a local grid during periods of time when grid energy demand is highest. According to an embodiment, the system further consists of various power electronic equipment such as switches, circuit breakers, power converters and inverters, and passive and active components, configured in a circuit topography that allows bi-directional power flow between a low-voltage alternating current (AC) grid and the EV fast charging system. The controller unit is able to communicate and exchange data via an application programming interface with a cloud-based service that persists and manages charging network data, for example EV fast charging system battery health data and grid demand data. The controller unit may receive and process charging network data using machine learning processes to optimize the performance of the charging system in regards to grid resource management, consumer EV fast charging station experience, and economic outcomes for all system actors such as system operators (owners), system users (customers), utility companies, and other third parties that may exist.

One of the goals of the EV fast charging system is to mimic a typical gas station experience for an EV and system user. This means that an EV driver can simply pull into an EV fast charging station, begin recharging his EV, and by the time he goes into the store to pay for the charge, buy snacks, or use the restroom, and come back out his EV will be partially charged (e.g., EV range increased by 40-200 miles) and ready to go without having to wait anywhere from thirty minutes to multiple hours. According to an embodiment, the system is able to support current and future EV battery and electronic architectures up to 950 V while providing direct current (DC) fast charging capabilities at 350 kWh to provide a charge range of up to 250 miles in about ten minutes of charge time. This capability brings EV recharge time more in line with ICEV refuel time. The controller can regulate the output of the EV outlet that connects the charging station to the EV in order to provide charging comparable to level one and two chargers to support existing EV architectures. The high-voltage battery pack is able to support fast charging of one or more electric vehicles at a time enabling more station throughput. According to an embodiment, EV charging may be limited to a block of time (e.g., 5 minutes, 10 minutes) to promote throughput, optimize queuing, and enhance the same experience as buying gas for ICEVs.

The EV fast charging system has a single-phase or three-phase connection to local, low-voltage AC grid that is used to charge the high-voltage battery pack and support EV charging operations. The single-phase or three-phase connection to the grid is isolated from the internal components of the system via an AC-DC to DC-DC converter-inverter circuit that also allows bi-directional flow of power between the grid and the charging station. The controller sends control signals to the power electronic components to direct the flow of power. This allows the charging station to provide the local grid with stored energy when grid conditions warrant the use of additional power reserves. When the charging station is operating to provide power to a local grid it effectively takes over the role of a power distribution substation and forms a microgrid supported by the grid energy reserves stored within the high-voltage battery pack. A traditional substation and the EV fast charging system share data and communicate via the distributed charging network in order to decide when a charging station should engage in grid balancing operations. The deployment of multiple EV fast charging systems represents a virtual "mini-grid" resource that can support local utilities and power service providers through grid balancing actions.

For example, consider two separate EV fast charging stations that are part of the same local grid. The charging stations are able to store energy in their battery packs that was purchased during off peak hours when power rates are low. During evening peak hours (5 pm to 9 pm) the local grid demand is barely being satisfied by grid utility. The substation that supplies power to the local grid can send grid demand and consumption data to the EV charging stations by way of the distributed charging network. The distributed charging network provides a control layer for all charging stations that tracks charging station operation such that it can virtually shift power among and between controllers in the "mini-grid". The EV charging stations use the grid demand and consumption data as well as battery health and EV charging data to determine the optimal amount of battery pack capacity to use as grid reserves. The two charging systems then begin operating in a grid balancing state where they provide EV charging capabilities and power to a local grid to satisfy grid demand. In this way energy purchased and stored during off-peak hours can be used during peak hours to provide lower cost power for consumers, EV drivers, and utilities, while also providing a percentage split in revenue for the EV fast charging station operator.

Furthermore, the EV fast charging system may be configured to begin storing energy based upon predetermined time or event conditions. For example, a timing condition may trigger the system to begin storing energy at a particular time of the day, such as a timing condition that causes the system to store energy at 2 PM in the afternoon to ensure that there are available energy reserves during rush hour to support EV commuters. Another type of condition is an event condition which triggers the system to begin energy storage when a specific event occurs, such as power rates dropping below a given threshold or grid demand grows beyond a threshold. The distributed charging network may access and store electric energy market rates within a database and use the stored data to tabulate and identify market trends using both simple graph analysis and machine learning algorithms, according to an embodiment. The distributed charging network may use the machine learning market rate predictions to autonomously begin energy storage when the market rates are at their lowest cost. In an embodiment, the system defaults to storing energy during periods of time when renewable energy generation is highest during the day (i.e., solar energy generation is highest during daylight hours) and when market rates are low and favorable. This enables the system to store and deliver a mixture of electricity generated from non-renewable sources and green electricity to EVs, which translates to net fewer emission miles required to recharge an EV.

Battery packs as used herein may comprise different battery technologies (i.e., physical/chemical compositions) and may be connected in series, parallel, or a combination of series and parallel, where batteries connected in series increase the voltage, and batteries connected in parallel increase the number of amps, and batteries connected in a combination of series and parallel increase both the voltage and amperage accordingly.

According to an embodiment, the charging station may store an amount of renewable energy in proportion to the renewable energy sources feeding into the grid at any given time. The distributed charging network may keep track of the proportion of renewable energy used to charge the high-voltage battery pack of a charging station within a time frame such as hourly, daily, weekly, monthly, yearly, total lifespan of the charging station, etc. Each charging station may optionally display the running total of the proportion of stored renewable energy to a display screen on the charging station informing charging station customers about the proportion of renewable energy used, and how that translates into much lower overall emissions. For example, the charging network may be able to view the proportions of renewable energy sources and non-renewable energy sources, and calculate the total amount of expected emissions that would have occurred (i.e., using emission rates per gallon of gasoline and using emission rates for non-renewable energy generation) if non-renewable energy sources were used exclusively. This total may also be displayed with the total proportion of renewable energy used to charge the station battery pack, thus giving charging station customers a transparent view into the energy consumption and environmental impact of their electric vehicles.

One or more different aspects may be described in the present application. Further, for one or more of the aspects described herein, numerous alternative arrangements may be described; it should be appreciated that these are presented for illustrative purposes only and are not limiting the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "grid balancing" is used to describe the task of supplying the correct amount of electricity to a grid in order to match the demand. Conventional power plants have to compensate for constant energy fluctuations because it is not possible to store electricity in large quantities over a long period of time. There is an equilibrium point that all grid networks operate at, in the United States the equilibrium point is held at a frequency of 60 Hz. If there is too much electricity when grid demand is low, then the electrical network frequency increases and power plants that are designed to operate with a certain frequency range can begin shutting down when the frequency is out of the range of operation. If instead, there is not enough electricity to meet the demand, then the frequency of the network drops and power plants may begin to shut down. In both cases, shut down of power plants leads to grid collapse and power blackout. "Grid balancing" tasks are used to maintain grid equilibrium.

As used herein, "resource adequacy" is the ability of a utilities' reliable capacity resources (supply) to meet the customers' energy or system loads (demand) at all hours.

Conceptual Architecture

FIG. 1 is a diagram of an exemplary system architecture for an extremely fast charging and distributed grid resource adequacy management system 100. In an embodiment, the system may be comprised of the following components: an input isolator 110, a high-voltage battery pack 120, a controller 130, a heat exchanger 140, a high-power direct current to direct current (DC-DC) converter 150, and one or more electric vehicle (EV) fast charging outlets 160 all self-contained within a single-box design. The single-box, self-contained design allows each charging station system 100 to be easily transported and deployed, requiring only a three-phase connection to an electric grid. The system 100 via the controller 130 may send or request data from a cloud-based service using a cloud-based service application programming interface (API) 101 that provides access to a distributed charging network that interacts with a storage device 104 that maintains a database of charging station information. Having an API is useful for third-party integrations, however the communication method between components is not limited to APIs. In various embodiments, communication between the various components may use one or more communication protocols used in the art such as HTTP(S), TCP/IP, FTP, UDP, etc. and utilize one or more communication means such as Zigbee, MQTT, WiFi, Zwave, Ethernet, Fiber, ISDN, PTSN, Cellular Networks, Bluetooth, Asynchronous Transfer Mode, etc. The deployment of multiple charging station systems 100 operates as a "mini-grid" while communicating with a distributed charging network that contains a control layer that can virtually "shift" power among and between charging station controllers 130 in the "mini-grid." The input isolator 110 contains power electronic components that both isolate the system 100 DC circuitry from the low voltage AC grid 102 and facilitate bi-directional power flow 103.

According to an embodiment, the input isolator 110 may contain power electronic components such as an alternating current to direct current (AC-DC) converter 111 and a DC-DC converter 112 in a series connection. The topography of the input isolator 110 is chosen such that the series connection of 111 and 112 forms a bi-directional AC-DC converter-inverter that can both convert AC to DC and invert DC to AC using the same circuit topography. A converter-inverter topography allows the system 100 to use the AC grid 102 power for charging the high-voltage battery pack 120 at optimal times based on certain conditions (e.g., when power rates are low cost or when the percentage of renewable energy generation entering the grid is high), or use the high-voltage battery pack 120 to release energy back into the AC grid 102, thus facilitating bi-directional flow 103 of energy to enable grid services such as frequency regulation and demand response. In an embodiment, a T-type inverter and a DC-DC converter, that provides isolation between the AC grid 102 system and the internal components of the system 100, are used to balance the voltages of the battery pack 120, however, other topologies and technologies exist such as cascaded H Bridge (CHB), modular multilevel converters (MMCs), and medium-voltage Silicon Carbide (SiC) devices, among others. The input isolator 110 is connected internally to an 800 Volt (V) bus 105 that is connected to the high-power DC-DC converter 150, a heat exchanger 140, and charges the high-voltage battery pack 120. The heat exchanger 140 is used to ensure the system 100 temperature is limited to safe operating conditions. The heat exchanger 140 may take many forms including, but not limited to shell and tube, plate, air-to-air, plate and shell, fluid heat exchangers, adiabatic wheel, and direct contact heat exchangers.

According to an embodiment, the high-voltage battery pack 120 supports a nominal voltage of 800 V and is able to store 350 kilo-Watt-hours (kWh) of energy. To enable 350 kilo-Watt (kW) extremely fast charging, the battery pack 120 is capable of sustaining up to 2 C discharge rates continuously. The high-voltage battery pack 120 may consist of one or more of a plurality of individual batteries configured in a series, parallel, or combination of series and parallel connections.

The EV fast charging outlets 160 allow for extremely fast charging of electric vehicles using DC-powered charging ports. In an embodiment, the DC power for the charging ports is delivered from either the high-voltage battery pack 120, or from the grid directly by way of the bus 105 and a high power, high efficiency DC-DC converter 150. In an embodiment, a half bridge converter is used to achieve the highest efficiencies, however, other topologies may provide DC-DC conversion such as buck and boost converters. The EV fast charging outlet 160 is also capable of providing charge at both level 1 and level 2 by limiting the total power output from the DC-DC converter 150 using control signals from the controller 130. With a maximum bus 106 voltage of up-to 1050 V the outlets 160 can charge vehicle architectures from 200-950 V which makes this system easily integrate with a rapidly growing and evolving EV industry. According to an embodiment, the charging cables that connect the EV fast charging outlets 160 must be able to withstand a peak current of 500 Amp (A) continuously at the output voltage of 700 V and be liquid cooled to properly handle heat transfer between the current carrying wire and the rest of the cable materials and components.

In an embodiment, the extremely fast charging and distributed grid resource adequacy management system 100 is controlled by an on-board, cloud-connected controller 130 that performs tasks to optimize energy storage, exchange, and distribution. The controller 130 is responsible for mediating grid energy flow optimization, active monitoring of battery health, communicating with EVs via a charger communication protocol, and communicating with a cloud-based service to submit and request various types of data including, but not limited to: grid status and capacity information, power rates, power consumption, charging station status details and history, EV status details and history, battery status and lifespan, payments, consumer profiles, and road and location data. According to an embodiment, one or more deployments of the system 100 operating as "mini-grid" may, through use of the cloud-based service API 101, form a distributed charging network that performs one or more of a plurality of functions including, but not limited to: receive grid status and capacity data from local utility companies; receive and transmit data from $3^{rd}$ parties, for example governmental partners or data analytic companies; receive and transmit data with mobile device applications; provide a control layer that tracks power usage of the "mini-grid" in order to virtually "shift" power among and between controllers in the "mini-grid"; and transmit and receive data from local telecommunication networks.

Although having an API 101 is useful for third-party integrations, the communication method between components is not limited to APIs. In various embodiments, communication between the various components may use one or more communication protocols used in the art such as HTTP(S), TCP/IP, FTP, UDP, etc. and utilize one or more communication means such as Zigbee, MQTT, WiFi, Zwave, Ethernet, Fiber, ISDN, PTSN, Cellular Networks, Bluetooth, Asynchronous Transfer Mode, etc.

Figure 2:
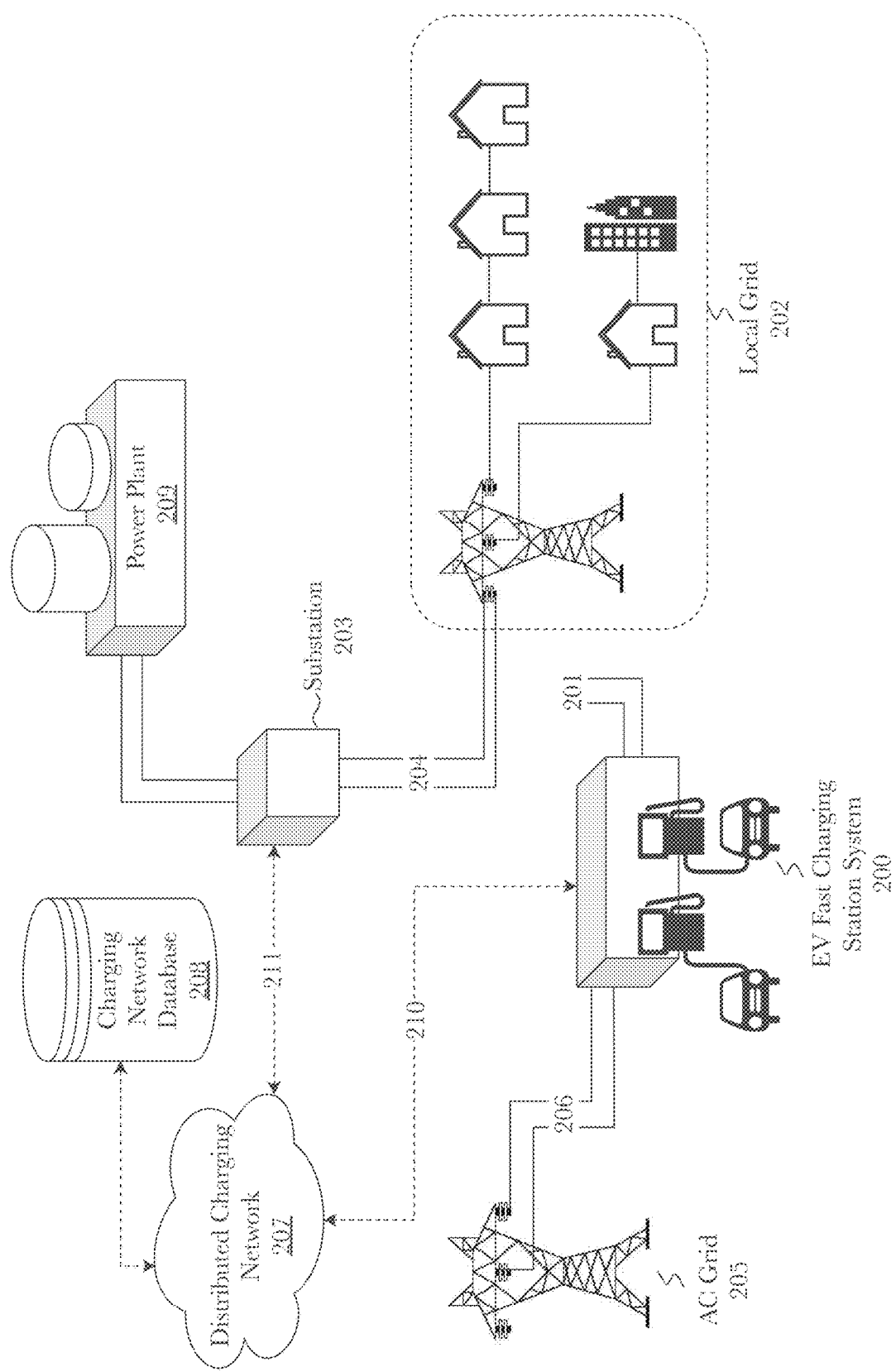
FIG. 2 is a diagram from a grid standpoint of an exemplary system for extreme fast charging for electric vehicles and distributed grid resource adequacy management operating without grid balancing.

FIG. 2 is a diagram from a grid standpoint of an exemplary system for extremely fast charging and distributed grid resource adequacy management 200 operating without grid balancing. When not facilitating grid balancing actions, the charging station system 200 operates while maintaining a connection 206 to the grid via transmission lines 205 that deliver the power required to operate the charging station system 200. The local grid 202, which may consist of homes, office buildings, industrial yards, etc., is supplied 204 power via a substation 203 that provides local area access to power that is generated at a power plant 209. The power plant 209 may generate power through any suitable practice including, but not limited to: hydroelectric, solar electric (photovoltaic), nuclear, fossil-fuel, wind, chemical, and heat (thermal) energy. According to an embodiment, the system 200 and the substation 203 both exchange data with a cloud-based distributed charging network 207 via API access 210, 211. The cloud-based distributed charging network 207 may be able to access a charging network database 208 to provide data that may be used to train, test, or trigger machine learning predictive processes or support other control operations, according to an embodiment.

One or more of a plurality of switches and circuit breakers may be contained within the system 200 to support resource adequacy management via grid balancing. When the extremely fast charging and distributed grid resource adequacy management system 200 is operating in a grid balancing off state the switches are configured in such a way to allow power to flow 206 from the low voltage AC grid 205 into the charging system 200 providing power that can be stored in a battery pack and discharged to provide extremely fast charging capabilities to EVs. The switches are controlled by a system 200 internal controller that communicates with the distributed charging network 207 that provides data about grid status and capacity information, battery status, power rates, etc. According to an embodiment, the controller uses data gathered from the distributed charging network 207 to manage and optimize energy storage and distribution when determining whether to operate in a grid balancing on or off state. When operating in the grid balancing off state the switches are configured so there is no power flow 201 from the charging system 200 in the direction of the local grid 202.

Figure 3:
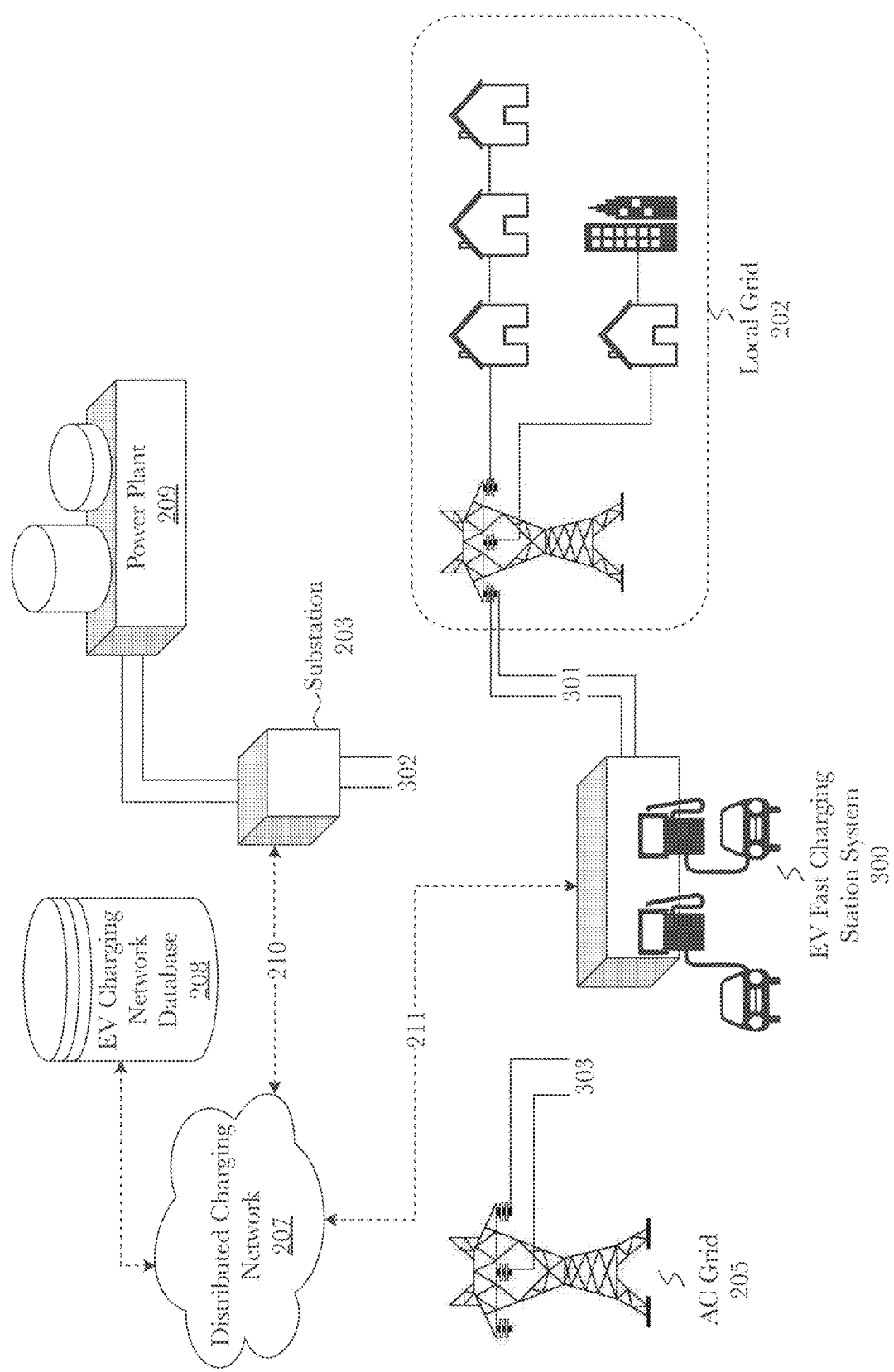
FIG. 3 is a diagram from a grid standpoint of an exemplary system for extremely fast charging and distributed grid resource adequacy management operating with grid balancing.

FIG. 3 is a diagram from a grid standpoint of an exemplary system for extremely fast charging and distributed grid resource adequacy management 300 operating with grid balancing. When the EV fast charging station system 300 is operating in a grid balancing state, the internal switches are configured in such a way to allow the system battery pack to supply 301 power to the local grid 202 via a bi-directional AC-DC converter-inverter, according to an embodiment. During grid balancing the battery pack is discharging energy, it is not storing energy, therefore the power does not flow 303 from the low voltage AC grid 205 into the charging system 300, rather it flows 301 from the charging station system 300 into the local grid 202. According to an embodiment, the charging system 300 may provide grid balancing to facilitate resource adequacy management by supplying power during peak power consumption periods at below market prices. For example, a charging system 300 may be able to charge its battery supply during off-peak hours when market rates for electric power are low. During peak power consumption periods, or periods during planned or unplanned grid shutoffs, the system can go into island mode, which means that the charging station system 300 is disconnected from the central power distribution system comprising the power plant 209, the substations 302, and transmission lines, and serves as a substation for and maintains a connection to a small local grid 202. The substation 203 and the charging system 300 are able to communicate via the distributed charging network 207 and when the charging station 300 begins to operate in the grid balancing on state, the substation 203 can shut off 302 power supply for the local grid 202 whose power needs are being supplied by the charging system 300.

Figure 4:
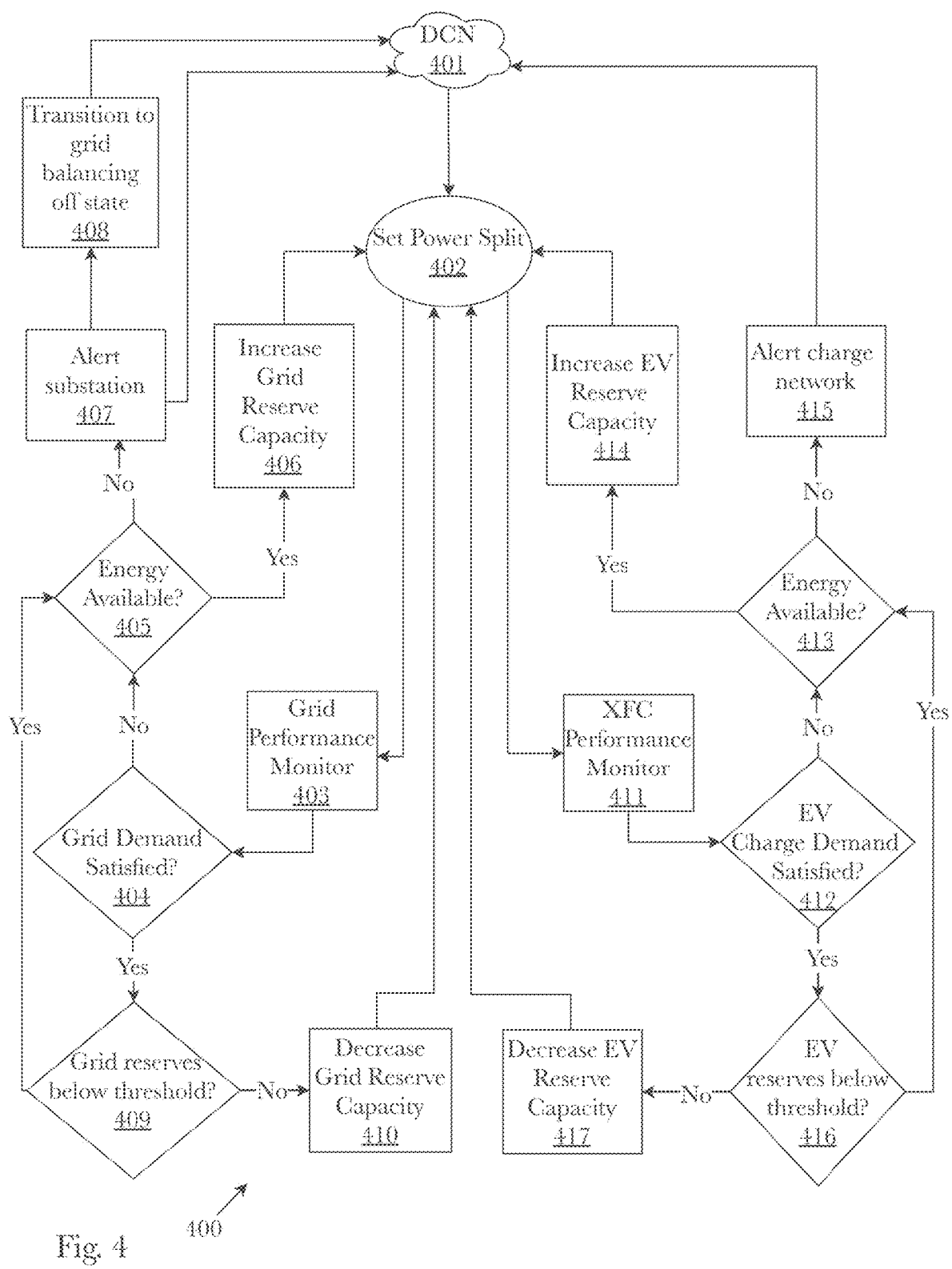
FIG. 4 is a flow diagram of an exemplary system optimization algorithm for managing the power split between grid reserves and EV charging while the charging station is operating with grid balancing.

FIG. 4 is a flow diagram of an exemplary system optimization algorithm 400 for managing the power split 402 between grid reserves and EV charging while the charging station is operating in a grid balancing on state. According to an embodiment, a controller decides the timing and destination of control signals, using data gathered via the distributed charging network (DCN) 401 to test and train machine learning predictive algorithms, to optimize the performance of various aspects of the charging station including, but not limited to: charging station-to-grid connection and interaction, its performance as "gas station" EV charging station, and its overall economic performance for the platform operator (something about battery performance). The controller receives and processes a plurality of DCN 401 data such as: grid status and capacity, battery status and lifespan, EV charging station usage, power consumption, power rates, consumer profiles, platform location, economic information, etc. According to an embodiment, the controller makes use of machine learning optimization algorithms and DCN 401 data to manage the power split 402 which is the proportion of available battery storage reserved for both grid balancing operations and EV fast charging operations. An initial power split may be determined by comparing the present states of both the grid and the charging station, as determined using the distributed charging network data 400, with similar historical states. This provides an initial, baseline power split that can be autonomously optimized for any given state of operation. The power split 402 levels are autonomously selected and the performance data of both the grid 403 and the extremely fast charging station 411 are monitored and used to fine tune optimal power split 402 levels.

A simple example of an autonomous optimization algorithm 400 that may be used within the controller of the charging system begins when an initial power split 402 level of operation is chosen for the charging system. The grid performance is monitored 403 at the chosen power split 402 level of operation. According to an embodiment, grid performance may be measured by one or more aspects including, but not limited to: grid demand, power consumption, data feedback from local utility, and capacity information. The grid performance monitor 403 may reference power demand and consumption levels on the local grid to determine if grid demand is being satisfied 404 by the current power split 402 levels. If grid demand is not being satisfied, then the next step is to use DCN 401 data relevant to battery health and status to determine if there is any available battery reserve energy 405 that can be transferred from the EV XFC reserves to the grid reserves. If there are no available reserves to be transferred, then an alert is generated 407 and sent via the DCN 401 to a substation responsible for providing power to the local grid that the charging station had just been performing grid balancing operations for, in order to ensure that the local grid has uninterrupted power access as the charging station begins to transition to a grid balancing off state 408. However, if there are available reserves that may be transferred then the grid reserve capacity will be increased 406 and the algorithm sets a new power split 402 level reflecting the increase in grid reserve capacity. If grid demand is being satisfied, the next step is to check if the grid reserves are below a predetermined threshold 409. The threshold may be determined using one or more of a plurality of metrics, for example a grid reserve threshold may be determined by calculating the amount of energy needed to power a local grid for thirty minutes at the current consumption rates. If the grid reserves fall below the threshold, the next step is determining if there is any available battery reserve energy 405 and proceed as described above. If the grid reserves are above the threshold, then the algorithm may decrease the grid reserve capacity 410 because if grid demand is satisfied and there are excess reserves such that the threshold was not crossed, then there is more reserve capacity allocated to grid operations that may be optimally used by transferring to EV XFC reserves for EV charging operations.

Continuing the simple example of an autonomous optimization algorithm 400, the EV fast charging station performance is monitored 411 at the chosen power split 402 level of operation. According to an embodiment, EV fast charging station performance may be measured by one or more aspects including, but not limited to: power rate, charge demand, data feedback from station users, and battery status. The XFC station performance monitor 411 may reference charge demand and consumer data to determine if charge demand is being satisfied 412 by the current power split 402 levels. If charge demand is not being satisfied, the next step is to check if there are available energy resources 413 that may be transferred from the grid reserves to the EV fast charge reserves. If there are no available reserves to be transferred, then an alert 415 is sent to the DCN 401 which can alert potential charge station users via a DCN 401 connected application or device that a charge station is currently unavailable for charging operations. However, if there is available energy that may be transferred then the EV reserve capacity will increase 414 and the algorithm sets a new power split 402 level reflecting the increase in EV reserve capacity. If EV charge demand is being satisfied, the next step is to check if the EV reserves are below a predetermined threshold 416. The threshold may be determined using one or more of a plurality of metrics, for example an EV reserve threshold may be determined by calculating the amount of energy needed to charge two vehicles. If the EV reserves fall below the threshold, the next step is to check if there are any available energy resources 413 and proceed as described above. If the EV reserves are above the threshold, then the algorithm may decrease EV reserve capacity 417 because EV charge demand is satisfied and there are excess reserves such that the threshold was not crossed, then there is more reserve capacity allocated to EV operations that may be optimally used by transferring to grid reserves for grid balancing operations. By iterating through the simple example optimization algorithm 400 the charging station is able to learn to set the power split 402 in various configurations to optimize both grid balancing and extremely fast charging operations.

As another example, an optimization algorithm may process both real-time and past power consumption data to identify trends in power consumption (e.g., on and off-peak hours) for a local grid system, coupled with charging station usage data to determine the optimal proportion of power split 402 between grid reserves and EV fast charging. The optimization algorithm may determine that splitting the battery capacity to 30% grid reserves and 700% EV fast charge reserves is optimal during off peak hours, but during on peak hours the split is determined to be 75% grid reserves and 25% EV XFC. The charging system optimization algorithm learns from experience by setting a power split 402 level and, during a period of time, monitoring 403, 411 and recording the performance (metrics) of the charging system vis-a-vis the grid, using the increase or decrease in performance (metrics) to determine the optimal power split level during the period of time. The charging system may determine, over time as the machine learning process trains the optimization algorithm, the optimal power split 402 that provides adequate grid reserves, enables a consumer friendly "gas station" EV fast charging station experience, and optimizes economic outcomes of the charging station operator (owner), the local utility company, and the user.

Figure 9:
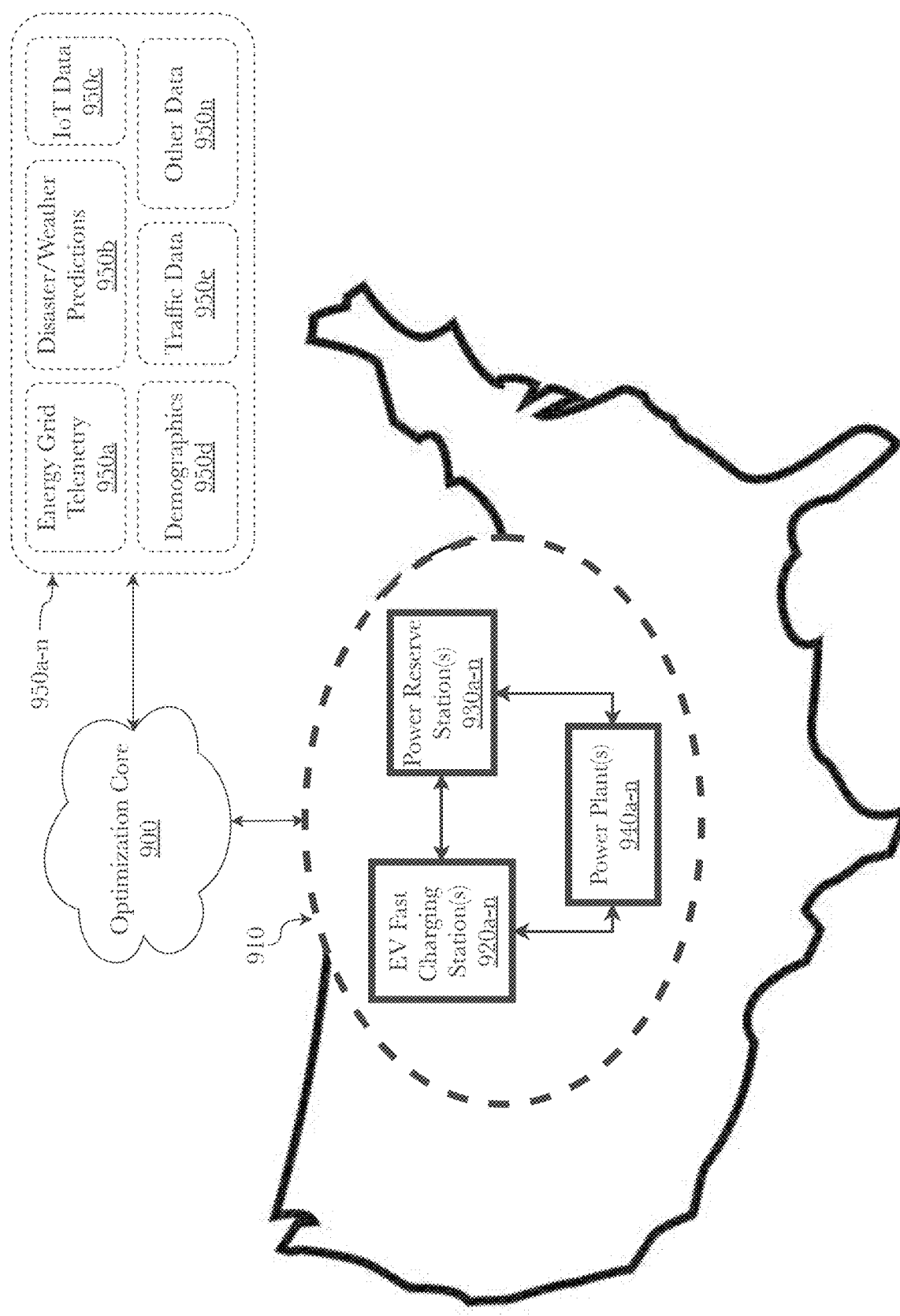
FIG. 9 is a diagram of an exemplary system architecture for a platform providing for a resilient and fortified electrical grid system.

FIG. 9 is a diagram of an exemplary system architecture for a platform providing for a resilient and fortified electrical grid system. The system comprises an optimization core 900 which is a cloud-based machine learning service that manages the strategic siting of stored power for use in managing and mitigating energy scarcity and disruption within an electrical grid 910. Optimization core 900 does so by ingesting a plurality of data 950*a-n* into one or more machine learning neural networks to identify optimal energy storage siting locations.

As at least FIG. 1 through FIG. 4 describe one or more energy storage devices (See at least components 100, 200, and 300), some of which function as EV charging stations, the energy storage devices according to this embodiment comprise one or more EV charging stations 920*a-n* and one or more power reserve stations 930*a-n*. Power reserve stations 930*a-n* may be configured similar to an EV charging station as described in FIG. 1 through FIG. 4 but without EV charging outlets 160. The purpose of power reserve stations 930*a-n* is to store energy in strategic locations for use in distributing power when and where needed—not only for charging vehicles, but any power need. However, it is entirely possible to implement such a system as disclosed herein without power reserve stations 930*a-n* because charging stations 920*a-n* as described herein would make power reserve stations 930*a-n* redundant granted there was a sufficient amount in the needed locations. The electrical grid 910 according to this embodiment is made up then of the current components (e.g., power plants 940*a-n*, feeder networks, etc.) and energy storage devices (e.g., EV charging stations 920*a-n* and (optional) power reserve stations 930*a-n*).

Optimization core 900 ingests data from power grid components (e.g., telemetry 950*a* from EV charging stations 920*a-n*, power reserve stations 930*a-n*, utility companies, network-connected devices, power plants 940*a-n*, etc.) and from data available from public and private data banks. Data of the former helps identify regions with frequent network outages and compare it to unfulfilled grid capacity in corresponding stations 920*a-n*/930*a-n*. Some examples of the latter data comprise disaster/weather predictions 950*b* (fire hazard information), IoT data 950*c* (e.g., network-connected sensors and devices), demographics data 950*d* (equity indicators), traffic data 950*e*, and other data 950*n* such as Big Data.

The importance of disaster weather predictions 950*b* is that often events such as wildfires and hurricanes caused disruptions in power distribution and forewarning of such events may allow optimization core 900 to strategically reallocate stored energy between energy storage devices (EV charging stations 920*a-n* and power reserve stations 930*a-n*) where such energy storage devices will be able to distribute electricity in the event the main supply (power plant(s) 940*a-n*) is disrupted. Additionally, optimization core 900 may perform cost-benefit analysis in order to determine the exact ratio of and location of energy. Demographics 950*d*, location-based or context-based data (such as annual events (i.e., tourism seasons)), traffic and map data 950*c* may all further inform optimization core 900 as to the demand and susceptibility of one or more local grids. As typical of machine learning, the more data ingested the better predictions become.

Figure 10:
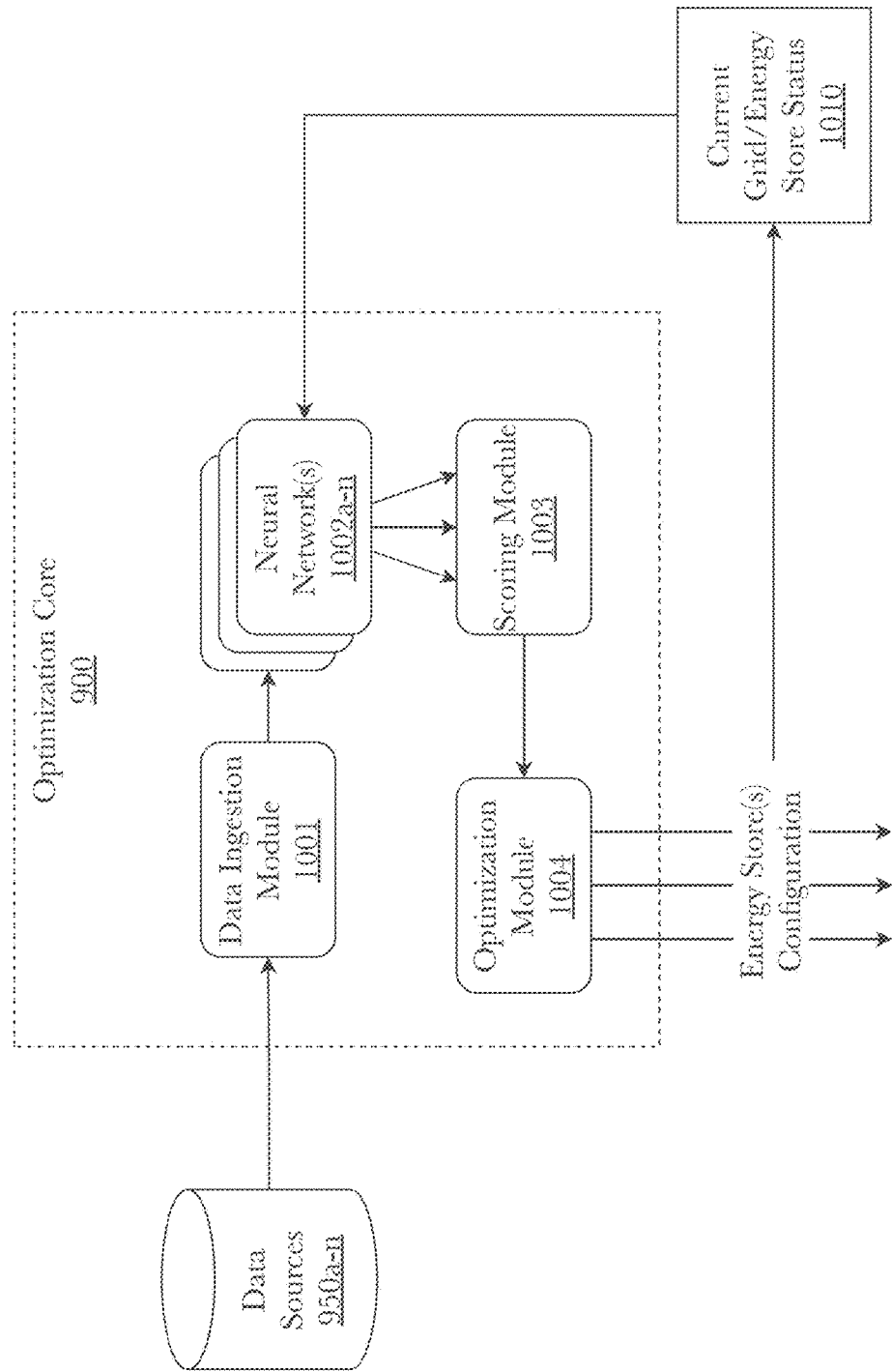
FIG. 10 is a diagram of an exemplary system architecture for an optimization core used in a platform providing for a resilient and fortified electrical grid system.

FIG. 10 is a diagram of an exemplary system architecture for an optimization core 900 used in a platform providing for a resilient and fortified electrical grid system. Optimization core 900 comprises a data ingestion module 1001 that performs data cleansing and preprocessing before one or more pluralities of data 950*a-n* is ingested through non-parametric or parametric classification methods into one or more machine learning neural networks 1002*a-n*. Various embodiments are anticipated where data 950*a-n* is cleaned and preprocessed before entering the optimization core 900, however the preferred method would be done automatically by the optimization core 900. As known to those with at least ordinary skill in the art, many machine learning models may be used in parallel, in place of, or in addition to those disclosed herein. A k-nearest neighbors model and neural networks approach is suggested here as way of example but is not to be interpreted as to limit the claimed invention to a k-nearest neighbors model, one or more neural networks, or any other machine learning model for that matter. Other better performing optimization models may be used as appropriate with continued tuning.

According to one embodiment, an ensemble of k-nearest neighbors neural networks are utilized for calculating a grid risk score, climate risk score, socio-economic score, and location score for some region in space. Regions may be configured to any desired parameters, whether that be State, County, City, feeder network, socio-economic status, or any other partitioning criteria deemed fit. The data for neural networks comes from, but not limited to, external data sources 950*a-n*/1010 as disclosed in FIG. 9. Each neural network calculates a score for its respective features and passes the score along to a scoring module 1003. The scoring module 1003 may sum each region's score which is then used along with other region's scores by an optimization module 1004 to reallocate or reconfigure the storage of energy for the grid. The summing of scores may also be fed back into one or more neural networks. These one or more neural networks may learn which scores are more important than others-based on parameters such as certain demographic properties or infrastructure condition—and improve each iteration's prediction as to the status and reallocation of the grid. Optimization module 1004 may also use machine learning to predict the most optimized distributing and use of energy in the grid. Neural networks used in score summing and optimization may be better suited with other algorithms such as support vector machines (SVM) depending on the number of inputs, which may be limited to a handful of regional scores. According to another embodiment, one neural network may be used for all regional scoring, score summing, and optimization. Once an optimal distribution and configuration of energy on the grid is determined, optimization core 900 sends out updated energy store configurations which instruct each energy store in the grid to either store more energy, release energy back into the grid, or maintain its current level of energy.

Another embodiment removes the neural network(s) and performs the same functions as described in the above paragraphs with only a k-nearest neighbors model. Yet even more embodiments may employ a k-means algorithm, support vector machines, logistical regression, various clustering algorithms, and other well-known machine learning models knows in the art.

Figure 11:
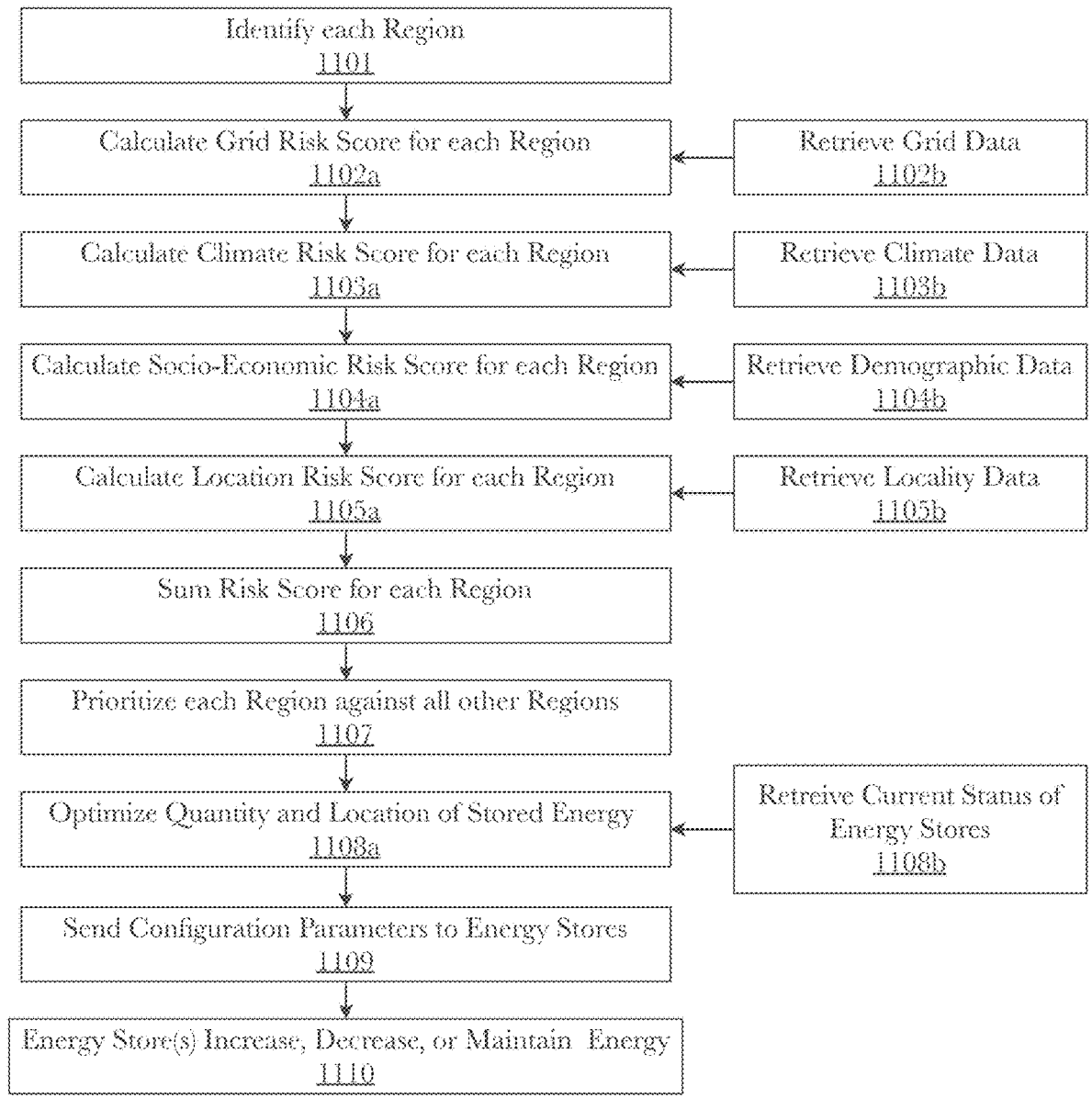
FIG. 11 is a flow diagram of an exemplary method for providing for a resilient and fortified electrical grid system.

FIG. 11 is a flow diagram of an exemplary method for providing for a resilient and fortified electrical grid system. The exemplary method comprises a first step of identifying each region 1101. Subregions (regions within regions) may also be identified as regionality is decided, or at least first configured, by a user. Meaning, that regions can be automatically determined or manually determined. Either way, regions may comprise the people, places, and things spatially constrained by some objective measure. One example may be to compartmentalize a city by neighborhoods. Each neighborhood comprises the electrical grid components that service that neighborhood, the data about the homeowners/renters of that neighborhood, and other public private data regarding each neighborhood. A second example is to make each feeder network a region, and subsequently assign geographically relevant data to each feeder network region. Utility companies may determine other more productive factors in determining the best regions than say a military installation. Each region may be configured or constrained by the implementor.

Steps 1102a-1102b involve ingesting grid telemetry data, utility company data, infrastructure data, historical outage data, and other data relevant to the electrical grid and using that data in a neural network to determine a grid risk score for that region. Steps 1103a-1103b involve ingesting historical and predicted local weather data, historical and predicted climate change data, historical and predicted natural disasters, and other data relevant to climate/weather and using that data in a neural network to determine a climate risk score for that region. Steps 1104a-1104b involve ingesting education data, employment data, income data, community data, and other data relevant to socio-economic factors and using that data in a neural network to determine a socio-economic risk score for that region. Steps 1105a-1105b involve ingesting foot traffic data, vehicle traffic data, GIS data, real estate data, business data, and other data relevant to location and using that data in a neural network to determine a location risk score for that region. Each region's grid score, climate risk score, socio-economic risk score, and location risk score may be combined for a total risk score representing that region 1106. It is anticipated that a neural network may be utilized to adjust the weights of each risk score as the machine learning modules learn to better predict optimizations 1107/1108a-b of the grid. For example, a high climate risk score—indicating an imminent disaster, is more pertinent in a cost-benefit analysis than a low location risk score—indicating a higher profit margin and increased demand, according to one embodiment.

Some regions make up larger regions, thus subregion scores may be summed to form the risk score of a larger region. Regardless of the scale of the regions or subregions, a next step entails determining which regions need energy more than other regions 1107, as in the high climate risk score/low location score example. With prioritizations determined, the actual availability of energy, current demand of energy, and status of stored energy is used to optimize a new configuration of stored energy in the energy storage stations across the considered regions 1108a-b. The updated configuration parameters set forth by the optimization is sent over a network to the energy stores 1109 such that the energy stores receiving the updated configuration parameters will begin to increase the amount of energy stored, release energy back into the grid, or maintain the level of energy already stored 1110.

Detailed Description of Exemplary Aspects

Figure 5:
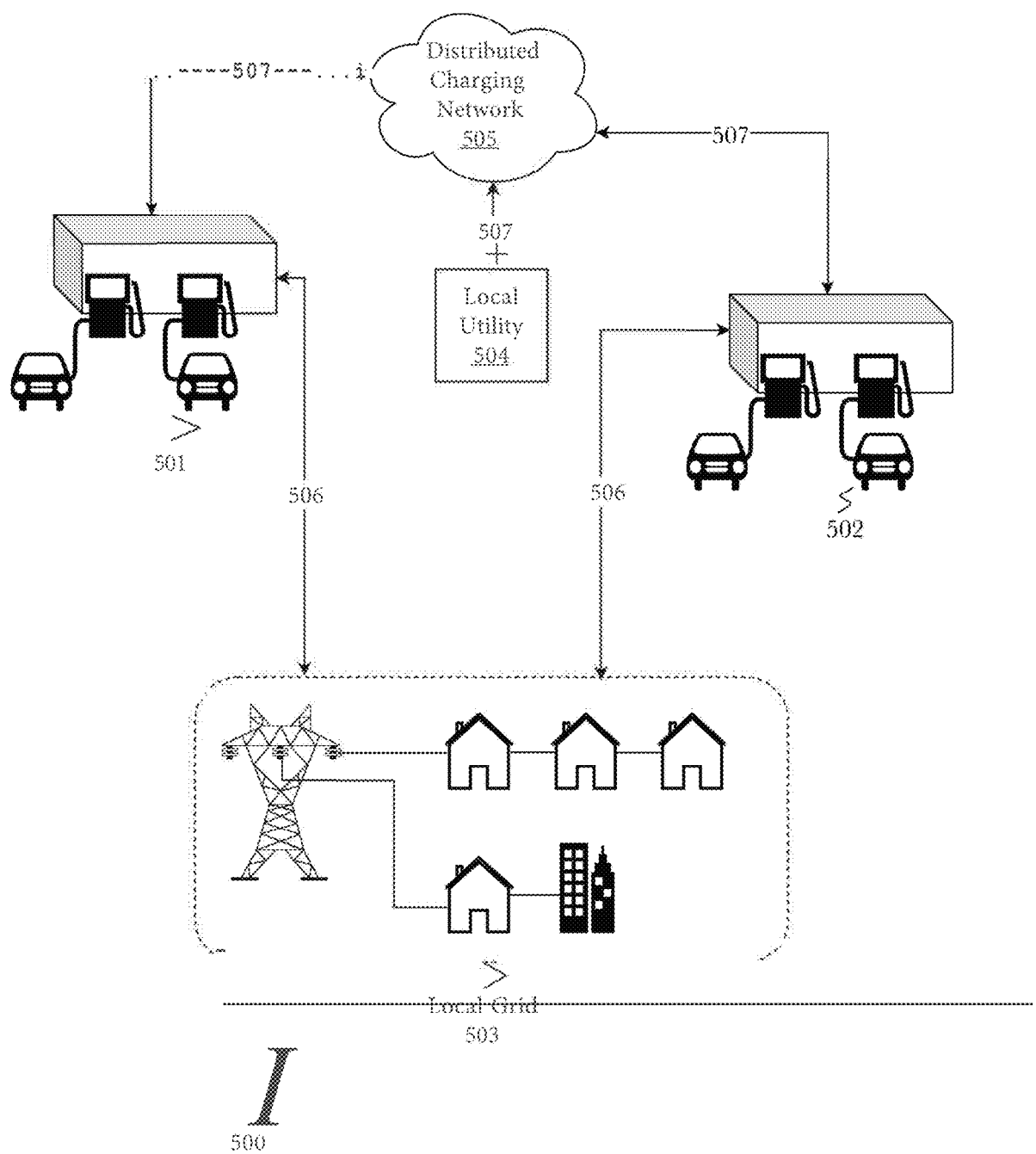
FIG. 5 is a diagram illustrating an exemplary scenario where multiple EV XFC stations are used to provide power resources to a single local grid, according to an embodiment of the system.

FIG. 5 is a diagram illustrating an exemplary scenario 500 where multiple EV fast charging stations 501, 502 are used to provide power resources to a single local grid 503, according to an embodiment of the system. The deployment of multiple EV fast charging stations and their connections 507 to the distributed charging network 505 represents a virtual grid resource that can be used by local utility 504 companies, who are also connected 507 to the distributed charging network, to manage resource adequacy by performing grid balancing operations. The diagram illustrates a scenario 500 where a local utility 504 is struggling to satisfy grid demand for a particular local grid 503. The local utility 504 is transmitting grid demand and consumption data to the distributed charging network 505 which can then be accessed by the EV fast charging stations 501, 502 to determine the optimal power split levels of the charging station battery storage device. In this case, the two EV fast charging stations are able to view the grid demand data and employ machine learning algorithms to decide the optimal power split levels for each charging station. For example, station 501 may be in an area that has high EV traffic and as such it needs to reserve a greater amount of reserve power for EV fast charge operations, whereas station 502 may be able to reserve more power for grid operations. The two stations 501 and 502 communicate with each other to optimize the energy reserves of both stations so that both local grid demand and EV fast charge demand can be met. When the optimal power split is determined, the stations may begin to provide grid balancing operations by supplying 506 power for the local grid 503.

Figure 6:
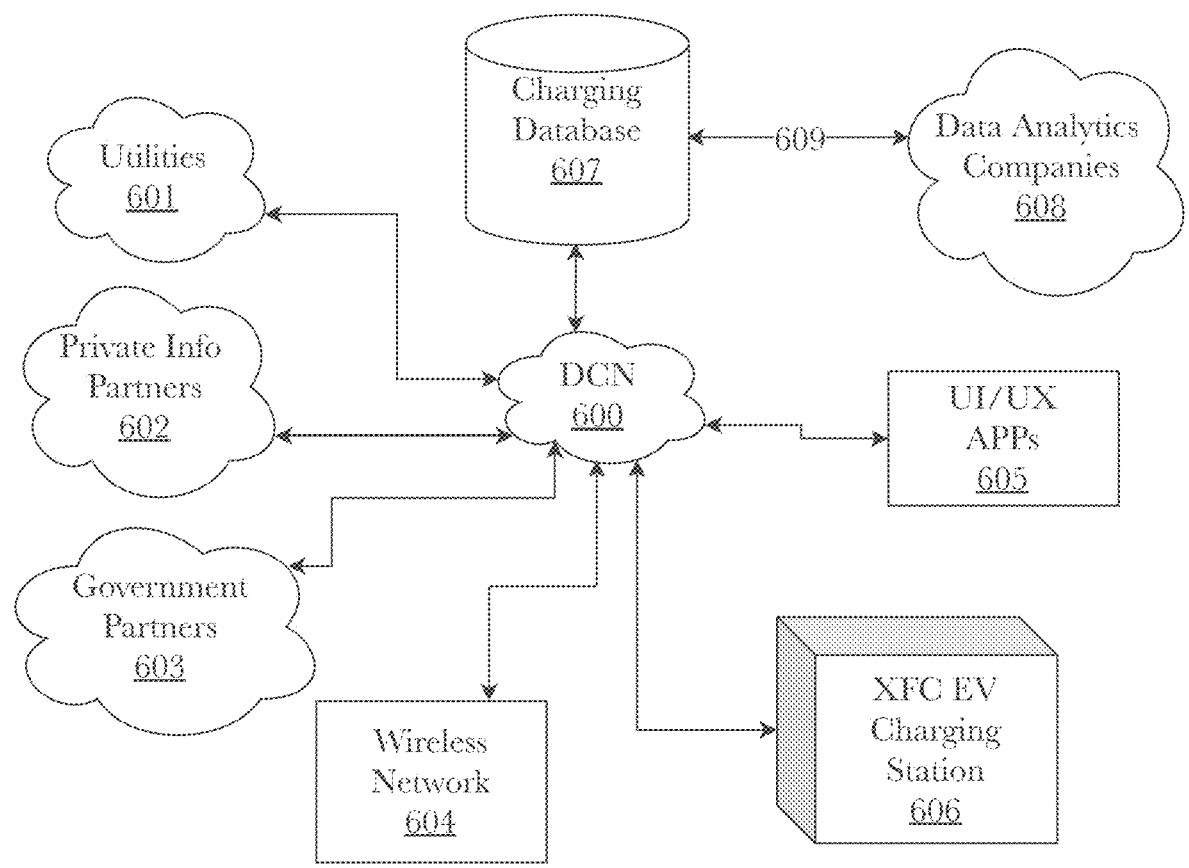
FIG. 6 is a flow diagram illustrating the information flow between various data sources and the distributed charging network.

FIG. 6 is a diagram illustrating the information flow between various data sources and the distributed charging network (DCN) 600. Example data sources include, but are not limited to utility companies 601; private information partners 602; government partners 603; wireless networks 604 such as 4G or 5G networks; multi-platform user interface 605 such as cell phone or computer apps; and the charging stations 606. The DCN 600 is accessed via an API and all exchanged data is persisted in a charging database 607. Utility companies 601 and the DCN 600 exchange data relating to grid status and capacity information such as grid demand, grid frequency, grid voltage, data feedback, power rates, grid balancing support, and power supplied to the station 606. Private information partners 602 may provide data such as traffic reports, EV location, user sentiment about charging station services, etc. Government partners 603 may exchange data about emergency alerts or regulations that affect charging station 606 operations. Types of data exchanged between the UI 605 and the DCN 600 may include on-the-go payments, station location, registration information, charge station subscription information, and contact information. The charging station 606 exchanges data pertaining to control, usage, alerts, battery status and lifespan, payments, and grid status. While wired network connectivity may be used, the DCN 600 can optionally facilitate the data exchange using wireless networks 604 and the charging station 606 may provide system redundancies in case of power blackout. If there is a power blackout, the wireless network 604 towers will also lose power, which often means current EV charging stations lose the ability to communicate with the grid and subsequently cannot provide a charge (as is the case in the prior art). The charging station 606 is able to power itself and perform charging services in the event of a grid blackout, as well as storing data such as payment transactions for later transmission and reconciliation, which means that EV drivers can charge their vehicles despite a lack of network 604 connectivity (whether wired or wireless). Additionally, the charging station 606 may be able to supply power to a local grid that includes a wireless network 604 tower, such that in the case of a power blackout the wireless network connection can be maintained and charging station operations may continue uninterrupted.

The charging database 607 provides long term storage of the data sent and received from the various data sources. This data contained within the database (e.g., power consumption, power rates, consumer profiles, appliances) can be sold 609 to utilities, car manufacturers, data analytics companies 608, etc., to provide an additional source of revenue to the charging station 606 operator.

Figure 7:
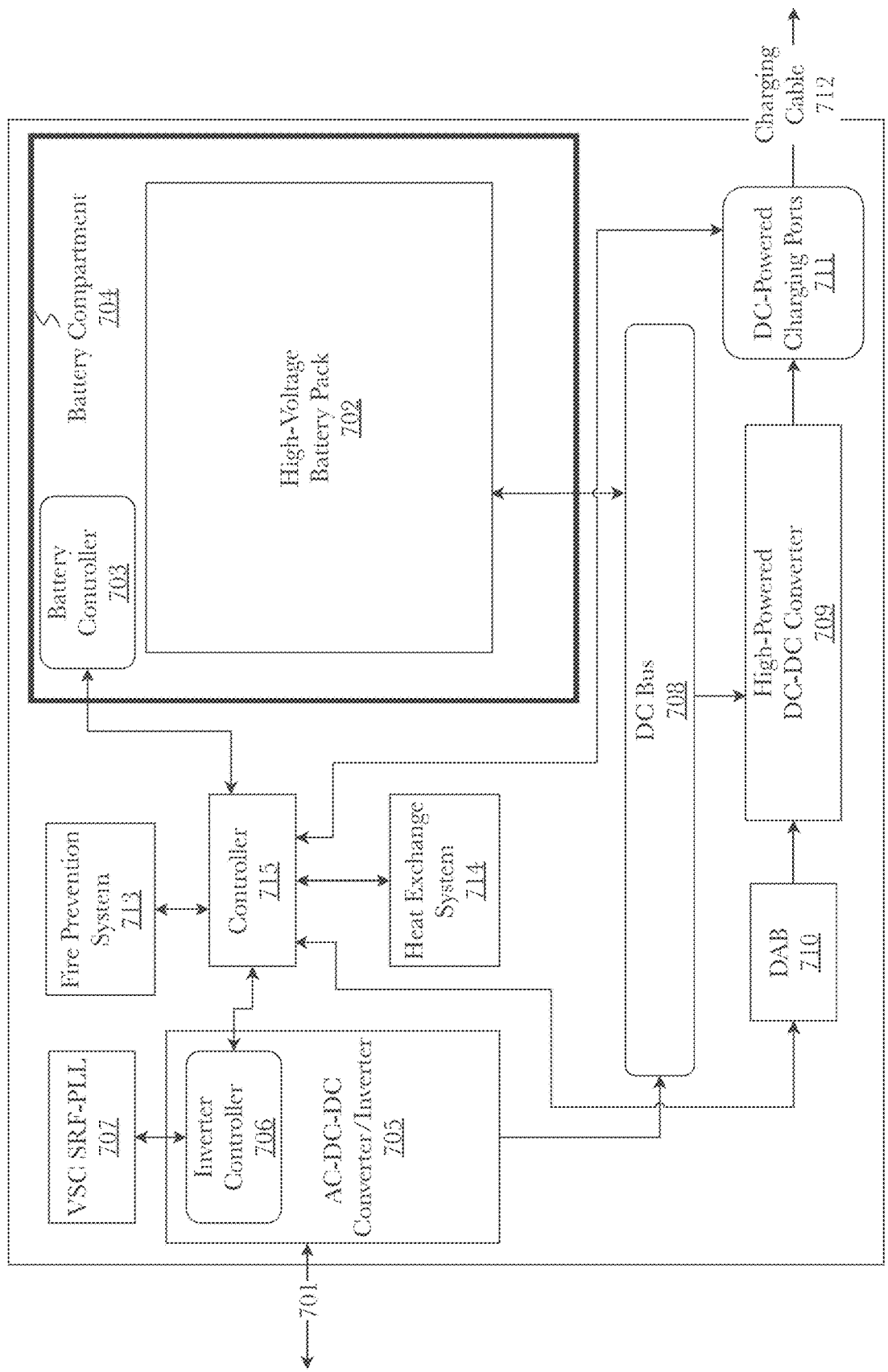
FIG. 7 is a diagram of an exemplary self-contained charging station system that provides both an electric vehicle fast charging service and a grid resource management service.

FIG. 7 is a diagram of an exemplary self-contained charging station system 700 that provides both an electric vehicle fast charging service and a grid resource management service. In a preferred embodiment, the system may be comprised of a high-voltage battery pack 702; an AC-DC-DC converter-inverter 705; a high-powered DC-DC converter 709; DC-powered charging ports and cables 711; a master controller 715; various safety systems (e.g., 713) like cooling systems; and various other power electronic components. In an embodiment, the system integrates the above-mentioned charging components and forms a single-box, self-contained charging station 700 requiring only a grid tie 701, typically a three-phase, 400 V RMS connection.

In an embodiment, the high-voltage battery pack 702 is designed to have a nominal voltage of 800 V in order to reach the final bus voltage (the voltage at the output of the high-powered DC-DC converter 709) of 950 V to provide adequate power to the DC-powered charging ports 711. The high-voltage battery pack 702 is constructed using an array of battery cells connected in series forming a module, where the combination of multiple modules is used to provide the nominal battery pack voltage of 800 V. The cells are cooled through extruded metal sections that take the heat away from the cells through a conductive gel. The heat from the metal extrusions is then taken away through liquid coolants supplied to the pack through one input/output port per battery array module. Each module has a battery controller 703 that monitors the temperature, voltage, and current of the module and feeds the data to the system controller 715. As an example, the array modules could be made from existing battery sources, for example Tesla Model S™ EVs or Samsung SDIs. Additionally, the high-voltage battery pack 702 is designed to be able to store 350 kWh of energy as well as to sustain up to 2 C discharge rates continuously to enable fast charging of electric vehicles. Charge and discharge rates of a battery are governed by C-rates. The capacity of a battery is commonly rated at 1 C, which means that a fully charged battery should provide a certain amperage for one hour (e.g., a battery rated at 1 amp-hour (Ah) should provide 1 A of current for one hour). The same battery discharging at 2 C would provide twice the amperage for half the time. The high-voltage battery pack 702 may be used to store energy when power rates are low, providing a low-cost energy reserve resource that can be used in a variety of ways. One use for the energy reserves may be to improve throughput to the charging station. For example, the charging station may provide charging services to two electric vehicles using battery reserves and then accommodate a third vehicle using energy directly taken from the grid, increasing the throughput of the station. Another potential use of the battery pack energy reserves could be to provide grid services such as frequency regulation and demand response. To protect against fire or explosion, the high-voltage battery pack 702 is housed within an enclosed battery compartment 704 made of steel 3.5 mm thick with the dimensions of about 7.5 feet long, 5.1 feet wide, and 4.2 feet tall. This will protect against damage from any impacts to the battery, while stopping any hazards to escape the station in case of a fire. Including the weight of the battery pack and the battery compartment, the overall weight of the battery system is about 6000 lbs.

In an embodiment, the AC-DC-DC converter-inverter 705 is directly tied 701 to a three-phase 400 V RMS grid connection, or a single-phase 208-240V connection and forms the input state to the charging station system 700. The AC-DC-DC converter-inverter 705 is a bi-directional circuit that allows power to flow from the grid into the charging station to power the charging ports 711 and to charge the high-voltage battery pack 702. In order for the charging station to power the 350 kW chargers, the power exchange between grid and charging station is limited to 60 kVA. The AC-DC-DC converter-inverter 705 consists of two converters. An AC-DC converter circuit featuring a T-type inverter which is a variation of the commonly used and known full-bridge inverter in which one of the four switching legs of a full-bridge is replaced with a T-type switching leg. The T-type inverter is more efficient than a full-bridge inverter because the addition of the T-type leg decreases switching voltages and frequencies. This has the effect of greatly reducing switching losses and inductor core losses, improving overall system efficiency. The second converter is a DC-DC converter system that provides electrical isolation and voltage balancing of the battery system. The DC-DC converter provides isolation between the AC side of the system and the DC side of the system by preventing AC harmonics in current and voltages from interfering with the DC componentry within the charging station. Additionally, the AC-DC-DC converter-inverter 705 is connected to an inverter controller 706 that communicates indirectly with the battery controller 703 via the system controller 715 to manage battery voltage and current parameters. The inverter controller 706 may consist of any suitable microcontroller device, for example a programmable logic controller (PLC). The system controller 715 is able to optimize the connection with the grid by sending control signals to the inverter controller 706 which regulates grid interfacing voltage using a voltage source converter (VSC) in a conventional synchronous reference frame phase-locked loop (SRF-PLL) 707 for synchronization with the three-phase grid. The VSC SRF-PLL 707 use a feedback loop to match the frequency and phase of the three-phase grid using control signals (e.g., pulse width modulation) from the inverter controller 706 to set the frequency and phase angle after each loop until the grid frequency and phase is matched. After the frequency and phase have been matched to the grid, the inverter controller 706 sends a signal to inform the system controller 715 that the station has an optimal connection to the grid.

In an embodiment, the output of the AC-DC-DC converter-inverter 705 is connected to an 800 V DC bus 708 that connects to the high-voltage battery pack 702 to provide power for charging the battery. The 800 V DC bus 708 also connects to a high-powered DC-DC converter 709 that boosts the 800 V DC bus to a final bus voltage of 950 V to power the DC-powered charging ports 711 and enable electric vehicle fast charging. The topology of the DC-DC converter 709 is built to be unidirectional and non-isolated as isolation is already achieved at the input stage. A dual active bridge (DAB) converter 710 may be used to control the voltage of the high-power DC-DC converter 709 to regulate the final bus voltage. The control parameters for the DAB 710 are the duty ratio and the bridge voltages, which can be set using a control signal from the system controller 715. In an embodiment, the DC-DC converter 709 is a half-bridge converter as opposed to buck-boost converters, as the half-bridge converter is known to achieve higher efficiencies than buck-boost converters. The DC-powered charging ports 711 are designed to operate as a unidirectional, non-isolated system (as isolation is already achieved in the input stage). The overall efficiency of the DC-DC converter 709 is expected to be upwards of 90%. In addition to providing DC fast electric vehicle charging, the DC-powered charging ports 711 are capable of providing EV charging at levels 1 and 2 by limiting the total power output to up to 15 kW, and the voltage ripple of the DC-DC converter 709 limited to 5%. With a final bus voltage of 950 V, the charging station 700 can charge vehicle architectures up to 740 V. Connected to the charging ports 711 are charging cables 712 that are designed to withstand 500 A of continuous current at a voltage output of 700 V. This corresponds to a max output of power at 350 kW, with an output voltage range of 250-950 VDC 50. The charging cables are no less than 15 feet in length and must be liquid cooled to support the 500 A continuous current. In an embodiment, the fluid used to cool the charging cables should be dielectric and non-flammable such as Novec™ fluids. Examples of other cooling fluids that may be used are mineral oils and water glycol. The DC-powered charging ports 711 communicate with the automotive body control module (BCM) through the combined charging system (CCS) standard to exchange data such as real-time EV battery charge capacity.

According to an embodiment, the fire prevention system 713 utilizes an aerosol application that stops potential fires through a chemical process that halts the chain reaction, providing an eco-friendly fire prevention system with built in redundancies to limit false activation of fire prevention measures. The fire prevention system 713 is connected with the system controller 715 to exchange data about the status of the fire prevention system 713.

The charging station system 700 also utilizes a heat exchange system 714 to regulate the heat generated from the electronic components due to the high voltage and current levels required by the station. In an embodiment, the heat exchange system 714 may consist of one or more air to air heat exchangers. Air to air heat exchangers represent a closed loop cooling system which uses heat pipe technology to exchange heat from the enclosure of the charging station to the outside. These types of heat exchange systems are very efficient at cooling because the waste heat is actually used to drive the system, and the only power requirement is to operate two circulating fans or blowers.

The operation of the charging station system 700 is managed by a system controller 715 that communicates with both the internal subsystems of the station and an external cloud-based network to monitor and optimize station performance. According to an embodiment, the controller 715 is responsible for controlling the output of the battery pack, optimizing EV charging services, optimizing the connection with the grid, talking with EV computer for calculating charge levels, sending charge station status data to the cloud-based network, receiving data from the cloud-based network, and using machine learning algorithms to manage grid services such as frequency regulation and demand response. All data exchange between the system controller 715 and the sub-system controllers is through a unified bus system, on SAE-J1772 protocol.

Figure 8:
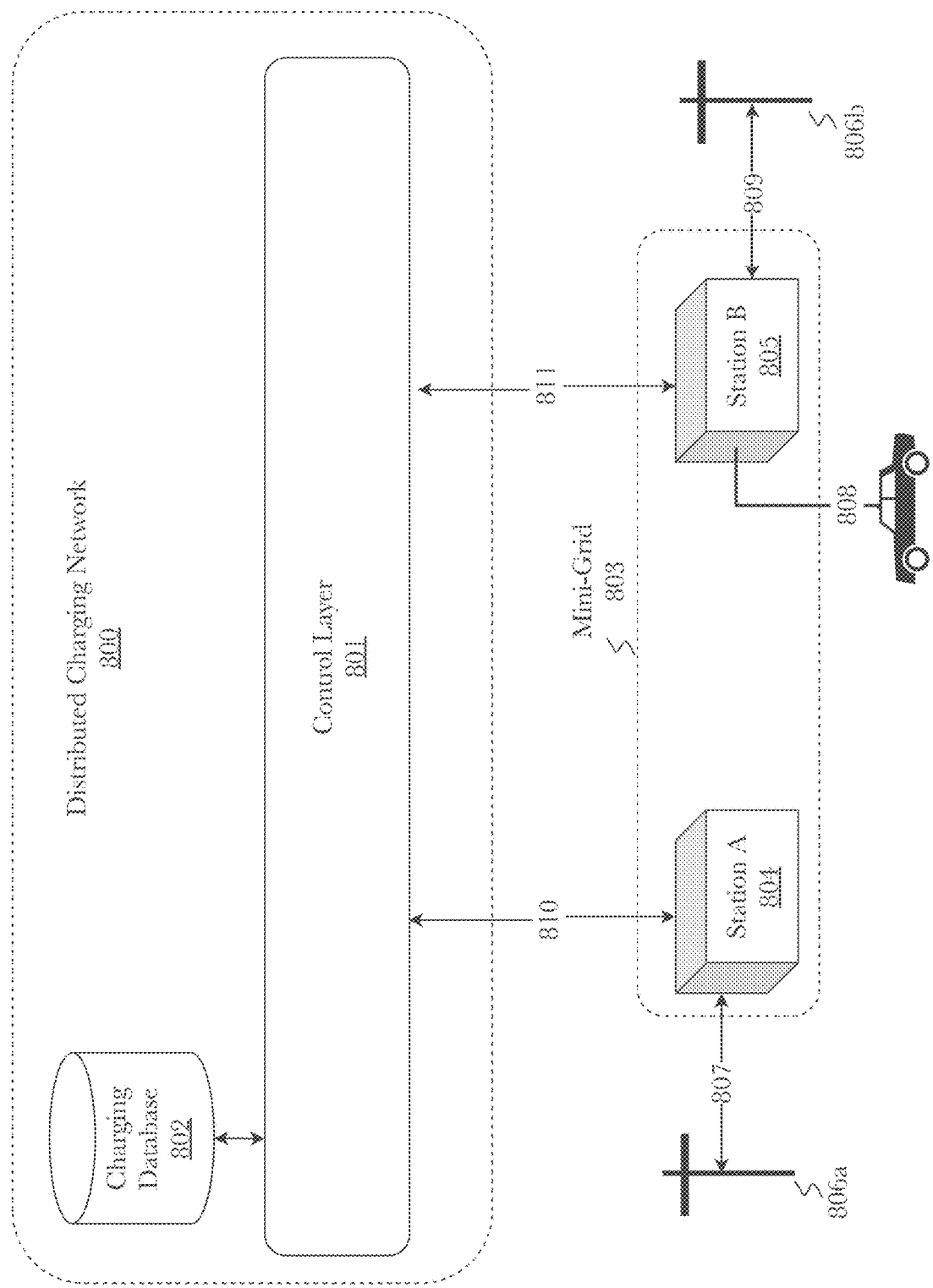
FIG. 8 is a diagram of a control layer, operating within a distributed charging network, performing control and optimization tasks to support "mini-grid" services and operations as carried out by the charging station system.

FIG. 8 is a diagram of a control layer 801, operating within a distributed charging network 800, performing control and optimization tasks to support "mini-grid" 803 services and operations as carried out by the charging station system. Each station individually, or in cooperation with other stations, acts as its own mini-grid 803 using a control layer 801 that tracks how much power charging station A 804 supplies to the grid 806a and how much power charging station B 805 takes out 809 of the grid 806b, such that it can virtually "shift" power among and between system controllers in the mini-grid 803. Both the control layer 801 and each charging station 804, 805 represent redundancy layers in case of power outages or supply problems in the power grid 806a-b. Machine learning algorithms may be used to determine when the mini-grid 803 should supply power to the main grid or should retain its power to support EV charging. The control layer 801 may access the charging database 802 which stores and manages all data received from various data sources including, but not limited to utilities, UI/apps, charge stations, government partners, and wireless networks. The control layer 801 employs machine learning algorithms that use the charging database 802 data to decide mini-grid 803 management and optimization tasks.

For example, the control layer 801, utilizing the charging database 802, retrieves and processes grid demand data, charge station battery and usage data, and charge station location data to determine how stations A 804 and B 805 should prioritize battery reserve capacity. In the event of a blackout or brownout, the control layer 801 using predictive algorithms may determine and instruct 810 that station A 804 should supply 807 power to the grid to balance out short fluctuations, but because station B 805 is in a location where EV charging service is heavily used, the control layer 801 will instruct 811 station B 805 to retain power as an emergency "get me home" resource for charging 808 EVs during a power blackout or brownout event.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 12:
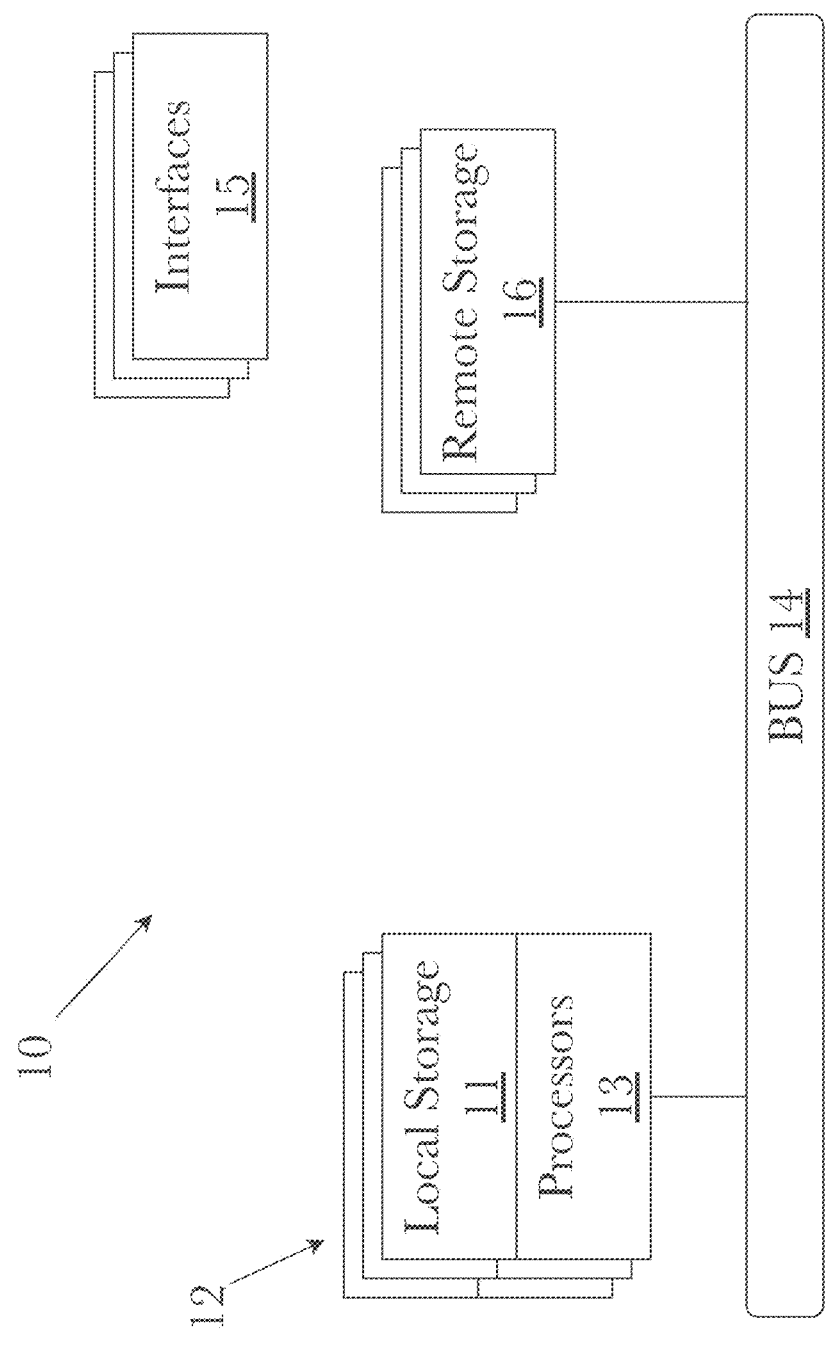
FIG. 12 is a block diagram illustrating an exemplary hardware architecture of a computing device used in various embodiments of the invention.

Referring now to FIG. 12, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 12 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 13:
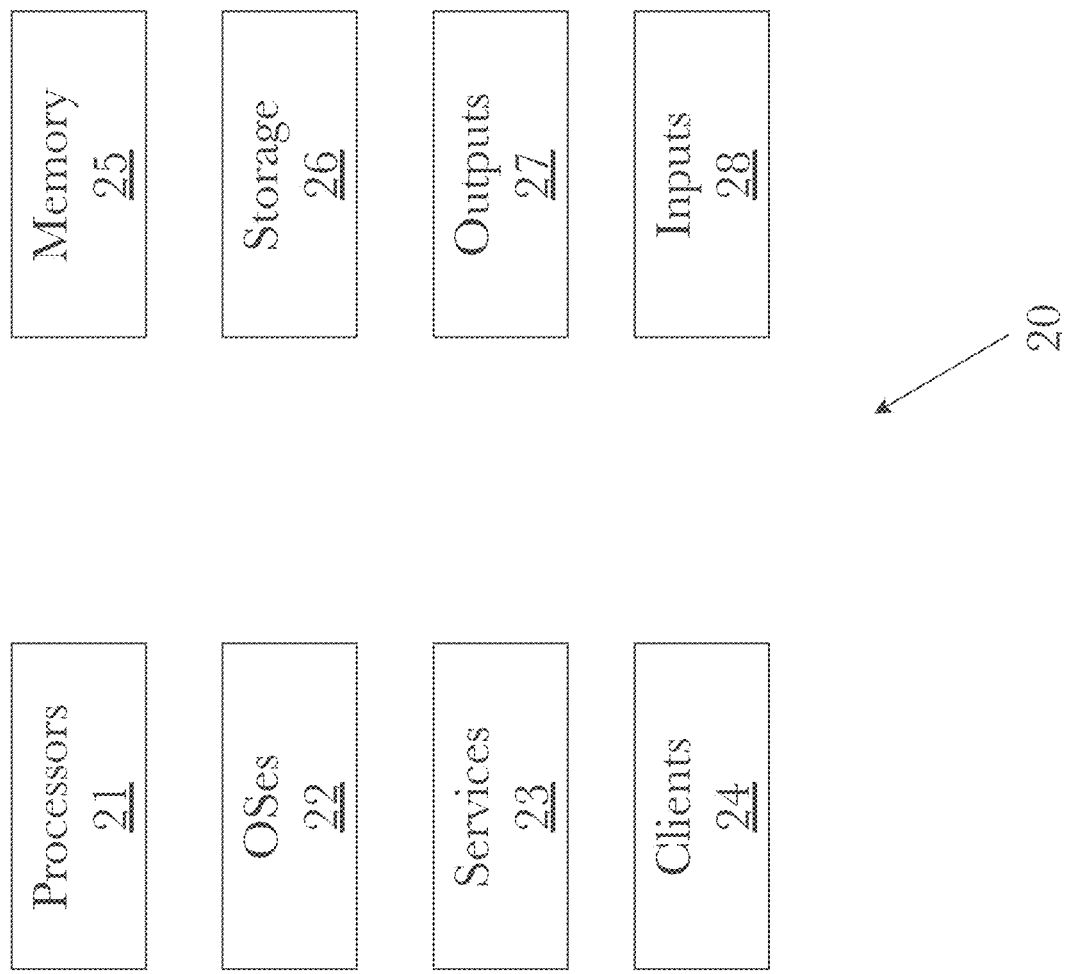
FIG. 13 is a block diagram illustrating an exemplary logical architecture for a client device, according to various embodiments of the invention.

In some aspects, systems may be implemented on a standalone computing system. Referring now to FIG. 13, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 12). Examples of storage devices 26 include flash memory, magnetic hard drive, CD-ROM, and/or the like.

Figure 14:
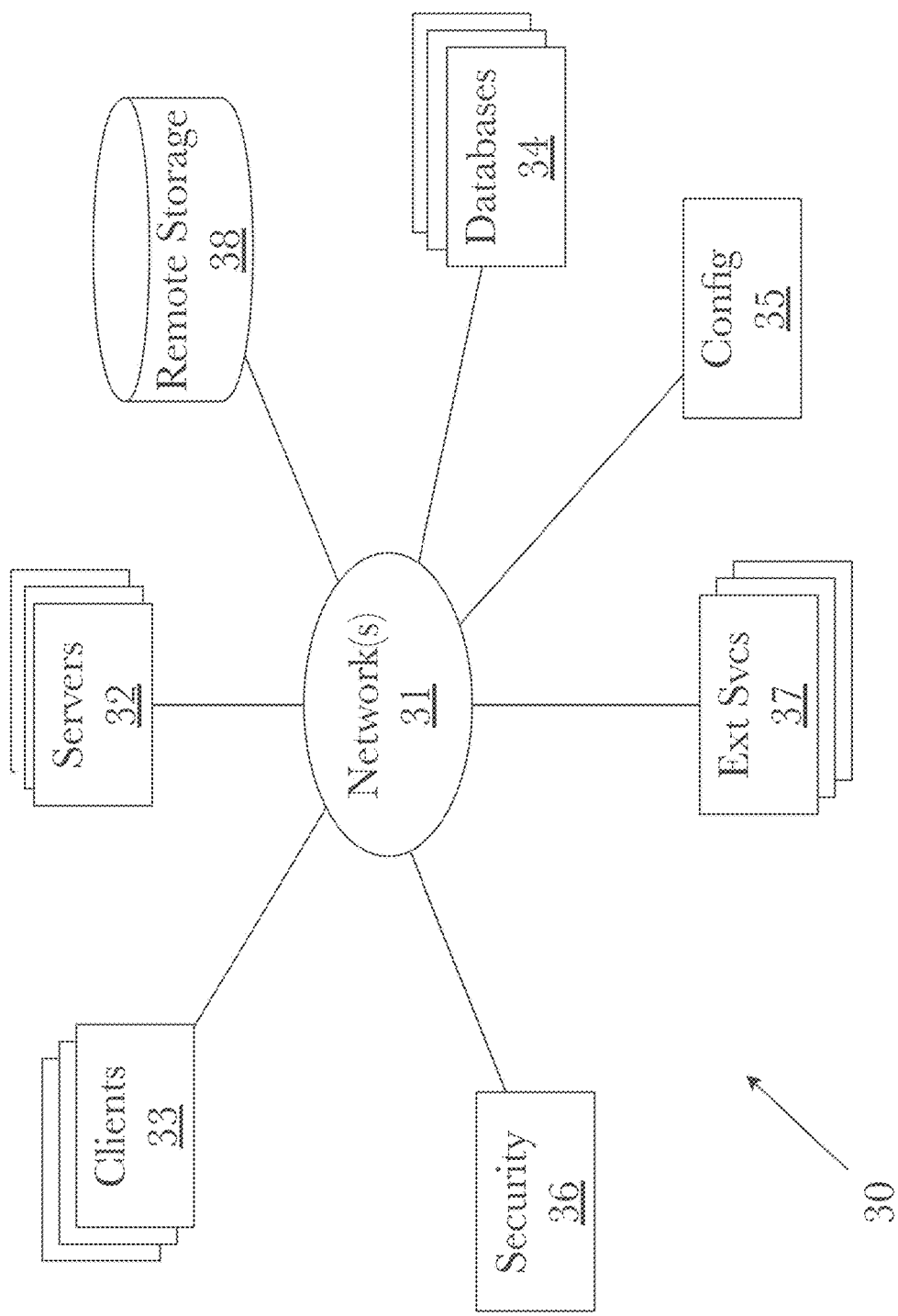
FIG. 14 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 14, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 12. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 15:
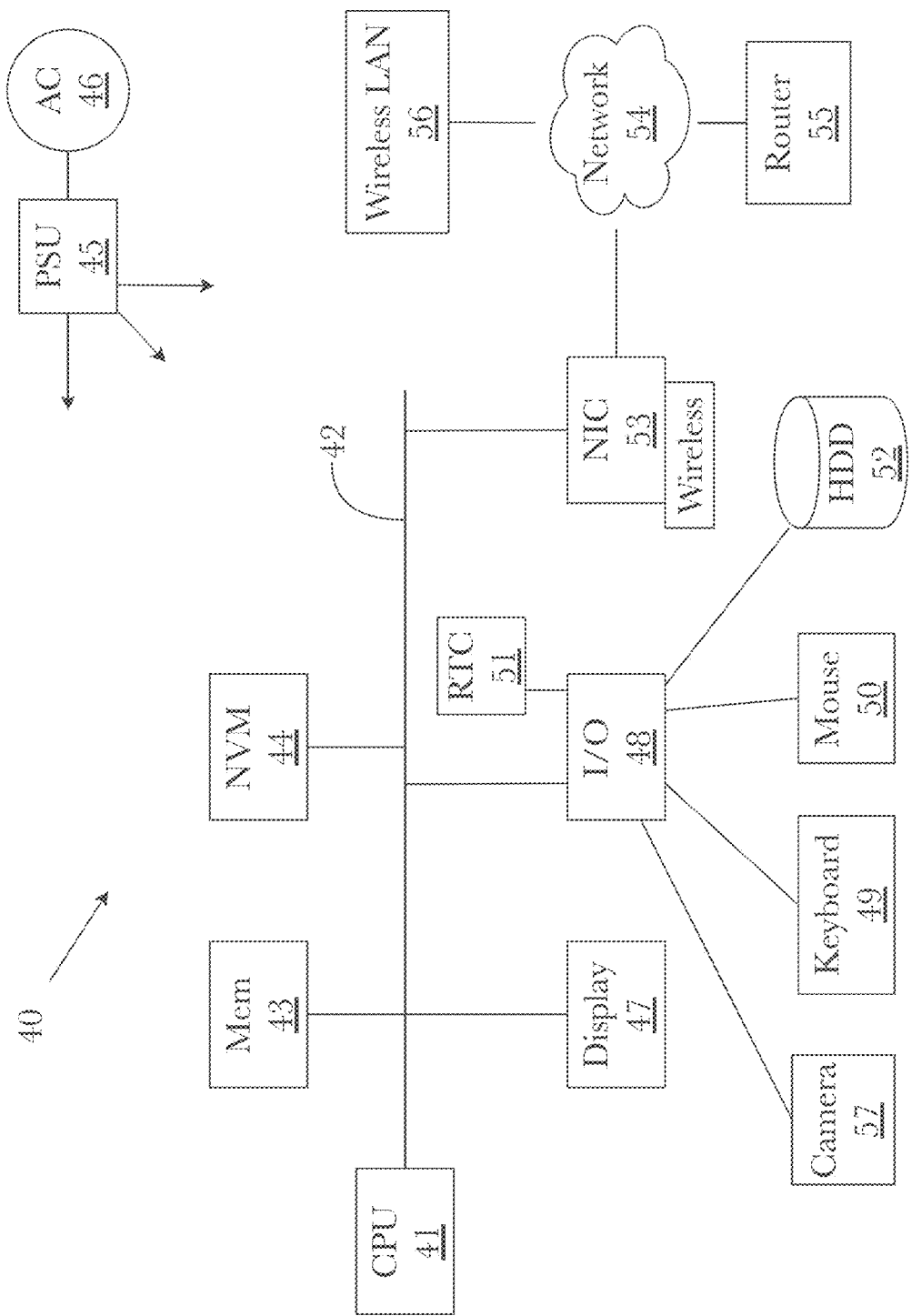
FIG. 15 is a block diagram illustrating an exemplary overview of a computer system as may be used in any of the various locations throughout the system.

FIG. 15 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for electrical grid management, risk-mitigation, and resilience, comprising:
 a first computing device comprising a memory, a processor, and a non-volatile data storage device;
 a second computing device comprising a memory, a processor, and a non-volatile data storage device;
 a high-voltage battery pack connected to a power grid;
 a controller comprising a first plurality of programming instructions stored in the memory of, and operating on the processor of, the first computing device, wherein the first plurality of programming instructions, when operating on the processor, cause the first computing device to:
  send a control signal to the high-voltage battery pack;
  monitor high-voltage battery pack health and status data;
  monitor health and status data about the power grid; and
  transmit the monitored health and status data to an optimization engine; and
 an optimization engine comprising a second plurality of programming instructions stored in the memory of, and operating on the processor of, the second computing device, wherein the second plurality of programming instructions, when operating on the processor, cause the second computing device to:
  retrieve training data relating to the electrical grid and its components for a plurality of specified regions;
  retrieve training data relating to the climate and weather for a plurality of specified regions;
  retrieve training data relating to socio-economic factors for a plurality of specified regions;
  retrieve training data relating to local behavior patterns for a plurality of specified regions;
  use the training data for each of the specified regions in the plurality of specified regions to calculate an overall risk score for each specified region;
  retrieve a status on the current energy demands for each of the specified regions in the plurality of specified regions;
  receive the monitored health and status data from the controller;
  use the overall risk scores and the current energy demands for each of the specified regions and electronic health and status data from the controller to optimize the energy storage of the high-voltage battery pack; and
  send a control signal to the controller, the control signal causes the high-voltage battery pack to store more power, store less power, or maintain the current level of stored power.

2. The system of claim 1, wherein the high-voltage battery pack further comprises an ultracapacitor which increases the overall lifetime of the system and improves the frequency response of grid balancing operations.

3. The system of claim 1, wherein the controller sets the time of charging of the high-voltage battery based on a grid condition.

4. The system of claim 3, wherein the grid condition is a time period wherein electricity rates are low.

5. The system of claim 3, wherein the grid condition is a time period when the proportion of energy supply to the grid from renewable energy sources is high.

6. The system of claim 1, further comprising two or more high-voltage battery packs.

7. The system of claim 1, wherein risk scores are calculated using one or more machine learning models.

8. The system of claim 1, wherein the risk scores are calculated using neural networks.

9. The system of claim 1, wherein the physical placement of current and future high-voltage battery packs is determined using the overall risk scores from a plurality of regions.

10. The system of claim 1, wherein the configuration of the high-voltage battery packs is determined using a machine learning model.

11. A method for electrical grid management, risk-mitigation, and resilience, comprising the steps of:
- retrieving training data relating to the electrical grid and its components for a plurality of specified regions;
- retrieving training data relating to the climate and weather for a plurality of specified regions;
- retrieving training data relating to socio-economic factors for a plurality of specified regions;
- retrieving training data relating to local behavior patterns for a plurality of specified regions;
- using the training data for each of the specified regions in the plurality of specified regions to calculate an overall risk score for each specified region;
- retrieving a status on the current energy demands for each of the specified regions in the plurality of specified regions;
- receiving health and status data about a high-voltage battery pack connected to a power grid;
- receiving health and status data about the power grid;
- using the overall risk scores and the current energy demands for each of the specified regions and electronic health and status data about a high-voltage battery pack to optimize the energy storage of the high-voltage battery pack; and
- sending a control signal, the control signal causing the high-voltage battery pack to store more DC power, store less DC power, or maintain the current level of DC power.

12. The method of claim 11, wherein the high-voltage battery pack further comprises an ultracapacitor which increases the overall lifetime of the system and improves the frequency response of grid balancing operations.

13. The method of claim 11, further comprising electronic health and status data about two or more high-voltage battery packs.

14. The method of claim 13, further comprising one or more control signals, the control signals causing the two or more high-voltage battery packs to each store more DC power, store less DC power, or maintain its current level of DC power.

15. The method of claim 11, wherein risk scores are calculated using one or more machine learning models.

16. The method of claim 11, wherein the risk scores are calculated using neural networks.

17. The method of claim 11, wherein non-training data is first preprocessed into training data.

18. The method of claim 11, wherein the physical placement of current and future high-voltage battery packs is determined using the overall risk scores from a plurality of regions.

19. The method of claim 11, wherein the configuration of the high-voltage battery packs is determined using a machine learning model.

* * * * *